US009286763B2

(12) United States Patent
Snow et al.

(10) Patent No.: US 9,286,763 B2
(45) Date of Patent: Mar. 15, 2016

(54) METHODS OF ADMINISTERING A WAGERING GAME BASED ON COMPARISON OF STRAIGHTS

(71) Applicant: Bally Gaming, Inc., Las Vegas, NV (US)

(72) Inventors: Roger M. Snow, Las Vegas, NV (US); Elliot Frome, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 129 days.

(21) Appl. No.: 13/920,028

(22) Filed: Jun. 17, 2013

(65) Prior Publication Data

US 2014/0370967 A1 Dec. 18, 2014

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC .......... *G07F 17/3293* (2013.01); *G07F 17/326* (2013.01)

(58) Field of Classification Search
USPC .............................. 463/20, 22, 25, 30, 40, 42
See application file for complete search history.

(56) References Cited

U.S. PATENT DOCUMENTS

| | | | |
|---|---|---|---|
| 6,164,651 | A | 12/2000 | Webb et al. |
| 6,755,741 | B1 | 6/2004 | Rafaeli |
| 6,789,801 | B2 | 9/2004 | Snow |
| 7,661,676 | B2 | 2/2010 | Smith et al. |
| 8,272,958 | B2 | 9/2012 | Smith et al. |
| 2005/0164759 | A1 | 7/2005 | Smith et al. |
| 2005/0164762 | A1 | 7/2005 | Smith et al. |
| 2007/0001396 | A1 | 1/2007 | Walker et al. |
| 2010/0016050 | A1 | 1/2010 | Snow et al. |
| 2013/0012293 | A1 | 1/2013 | Walker et al. |
| 2013/0029738 | A1 | 1/2013 | Snow |
| 2013/0053117 | A1 | 2/2013 | Snow |

OTHER PUBLICATIONS iPoker Games List, "101 iPoker Games," <http://scenario.com/ipoker/games/main.htm> Oct. 19, 2007, 14 pages.

State of Washington, Gambling Commission, Letter from Tina Griffin to Robert Saucier, Galaxy Gaming Inc., with attachments, dated Mar. 1, 2012, 16 pages.

U.S. Appl. No. 13/353,194, filed Jan. 18, 2012, titled "Network Gaming Architecture, Gaming Systems, and Related Methods," to Costello et al.

(Continued)

*Primary Examiner* — Adetokunbo O Torimiro
(74) *Attorney, Agent, or Firm* — TraskBritt

(57) ABSTRACT

Methods of administering wagering games include comparing a longest straight of a first set of cards with a longest straight of a second set of cards. A payout may be paid to a player associated with the first set of cards when the longest straight of the first set of cards is longer than the longest straight of the second set of cards or the longest straight of the first set of cards is of equal length to the longest straight of the second set of cards and a final card of the longest straight of the first set of cards is higher or equal in rank to a final card of the longest straight of the second set of cards. Systems, gaming tables, and electronic gaming machines to perform such methods are disclosed.

6 Claims, 11 Drawing Sheets

(56) References Cited

OTHER PUBLICATIONS

U.S. Appl. No. 13/609,031, filed Sep. 10, 2012, titled “Network Gaming Architecture, Gaming Systems, and Related Methods,” to Costello et al.

U.S. Appl. No. 13/871,824, filed Apr. 26, 2013, titled “Distributing Supplemental Pot in Wagering Games Based on Predetermined Event,” to Castle et al.

Waks Household Wiki, “Poker Rules,” Jan. 11, 2013, 7 pages.

Wizard of Odds, “High Card Flush,” <http://wizardofodds.com/games/high-card-flush/> 1998, 3 pages.

METHODS OF ADMINISTERING A WAGERING GAME BASED ON COMPARISON OF STRAIGHTS

FIELD

The disclosure relates generally to methods of administering wagering games for casinos and other gaming establishments, and related systems and apparatuses. For example, disclosed embodiments relate to methods of administering wagering games employing physical playing cards or representations of playing cards.

BACKGROUND

Poker is a popular wagering game played in casinos and other gaming establishments. Many variants of poker have been developed, including without limitation, five-card draw, five-card stud, seven-card stud, MISSISSIPPI STUD™, TEXAS HOLD'EM™, ULTIMATE TEXAS HOLD'EM®, and LET IT RIDE®. Decks of 52 cards or representations of cards are often used in playing these games.

Poker games conventionally use a hierarchy of various hands based on statistical probabilities of obtaining the respective hands. For example, in some poker games that are 5-card games, the following hands are ranked in order, from highest to lowest: royal flush, straight flush, four of a kind, full house, flush, straight, three of a kind, two pair, one pair, and high card. The hierarchy of combinations varies with the number of cards in the hand.

Since the number of cards employed in a particular poker game is fixed within certain practical limits, and various poker hands and their relative ranks are and have been well-established for over a century, evolution of the game of poker in terms of meaningful variations is somewhat constrained. However, there is a market for new and more interesting ways to play poker games with easy to understand and entertaining game play.

BRIEF SUMMARY

In some embodiments, the present disclosure includes methods of administering a wagering game. In accordance with such methods, an ante wager may be accepted from at least one participating player, and a set of player cards may be dealt to the at least one participating player. A set of dealer cards may also be dealt face down to a dealer position. The set of dealer cards may be formed of the same number or at least one more card than the set of player cards. The at least one player may be allowed to inspect his or her set of player cards. A play wager may be accepted from the at least one participating player. After revealing the dealer cards, the ante wager and the play wager may be resolved. Wager resolution may include comparing a longest straight of the set of player cards of the at least one player with a longest straight of the set of dealer cards, and paying a base game payout to the at least one player solely when the longest straight of the set of player cards of the at least one player is longer than the longest straight of the set of dealer cards or the longest straight of the set of player cards is of equal length to the longest straight of the set of dealer cards and a final card of the longest straight of the set of player cards is higher or equal in rank to a final card of the longest straight of the set of dealer cards. In one embodiment, the ante wager pays 1:1 and the play wager pays according to an odds payout schedule.

In some embodiments, the present disclosure includes additional methods of administering a wagering game. In accordance with such additional methods, a first set of cards and a second set of cards may be dealt face down to respective first and second positions. An ante wager may be accepted from a player associated with the first set of cards. The player may be allowed to inspect the first set of cards and to fold or place a play wager to stay in the game. A play wager may be accepted from the player. A longest straight of the first set of cards may be compared with a longest straight of the second set of cards. The ante wager and the play wager may be resolved, including paying a base payout to the player when the longest straight of the first set of cards is longer than the longest straight of the second set of cards or when the longest straight of the first set of cards is of equal length to the second set of cards and the final card of the longest straight of the first set of cards is higher or equal in rank to the final card of the longest straight of the second set of cards, wherein the base payout is at least a fixed odds payout corresponding to a difference in length between the longest straight of the first set of cards and the longest straight of the second set of cards. In one embodiment, the base payout includes a 1:1 payout on the ante and an odds payout on the play bet.

In additional embodiments, the present disclosure includes a gaming table for administering a wagering game, including a playing surface including at least one player interface for at least one player position and at least one processor. The at least one processor may be programmed to: accept an ante wager input from each participating player; process rank information of seven player cards dealt to each participating player; receive from each participating player an indication to fold or an indication to place a play wager; accept the play wager from at least one participating player; process rank information of eight dealer cards dealt to a dealer position; identify a longest straight of the seven player cards dealt to each participating player from whom a play wager was accepted; identify a longest straight of the eight dealer cards; compare the longest straight of the seven player cards dealt to each participating player from whom a play wager was accepted with the longest straight of the eight dealer cards; and process payment of a base payout to each participating player with a longest straight that is longer than the longest straight of the eight dealer cards or that is equal in length to the longest straight of the eight dealer cards and includes a final card that is higher or equal in rank to a final card of the longest straight of the eight dealer cards.

In one embodiment, a method of administering a wagering game over a network is disclosed. According to the method, authorization from the player to place an ante wager may be received at a user interaction server. After receiving an indication of a wager, the user interaction server delivers player card information that includes at least the rank of each card in the player hand. Player hand information is displayed to the player. Instructions are sent to a player interface to input a fold or a play election. When a signal indicating a fold election is received, play ends and the house takes the ante wager. When the play election indication is received, the user interaction server then sends an instruction to the player display to reveal the dealer hand. The revealed dealer hand and the player hand are evaluated to determine a number of cards that can be used to form a straight, and then the hands are compared to determine which hands have a straight and which hand includes more cards in the straight. If the player hand is of a higher or equal value to the dealer hand straight, the player wins a payout on the base game wagers. When the player hand uses more cards to make a straight than the dealer hand, or the player hand uses an equal number of cards, but a lowest (or highest) ranking card exceeds a lowest (or highest) ranking card in the dealer hand, or the player hand and dealer hand is identical in rank (a copy), the player is paid a base game payout. This payout can be 1:1 on the ante and an additional odds payout on the play wager, depending upon the number of player cards in the straight in excess of the number of dealer cards in the dealer straight. The user interaction server confirms the win or loss and either credits the win meter by the appropriate payout amount or takes the wager.

The present disclosure includes other embodiments of methods of administering a player-banked wagering game over a network. In accordance with such methods, authorization from players to receive a first poker pot bet to be placed in a first pot is received. Authorization to receive a player-banked ante wager in a player-banked second pot may be received at a user interaction server. Rank information for seven cards allocated to each player may be sent from the user interaction server. User instructions from each player to fold or to place a play wager in the player-banked second pot may be received at the user interaction server. The second pot may accumulate from round to round. Rank information for eight dealer cards may be sent from the user interaction server. The longest straight of the allocated seven cards of each player from whom instructions were received to place a play wager in the player-banked second pot may be evaluated at a game server. The longest straight of the eight dealer cards may be evaluated at the game server. The ante and play wagers may be resolved by comparing at the game server the longest straight of each player's allocated seven cards with the longest straight of the eight dealer cards. Amounts won in the player-banked second pot may be awarded to the player or players with the longest straight formed of the greatest number of cards. In some embodiments, the online gaming provider takes a rake on wagers made, payouts awarded, or both. The poker pot is resolved by awarding the player with the longest straight amongst the other players at the end of each round of play.

In additional embodiments, the present disclosure includes methods of administering a play-for-free wagering game over a network. In accordance with such methods, a quantity of valueless wagering elements usable within a predetermined time period may be sent from a user interaction server to players. Authorization from each player to allocate at least one valueless wagering element to an ante wager may be received at the user interaction server. Rank information for a set of player cards allocated to each player may be sent from the user interaction server. An indication from each player to fold or to allocate at least one additional valueless wagering element to a play wager may be received at the user interaction server. Rank information for a set of dealer cards may be sent from the user interaction server. A longest straight of each player's allocated set of player cards and a longest straight of the set of dealer cards may be evaluated at a game server. The ante wager and any play wager may be resolved by comparing at the game server each player's longest straight to the dealer's longest straight, wherein at least one valueless wagering element is awarded to a player achieving a longer straight than the dealer's longest straight or a longest straight of equal length with a higher or tied final card in the player's longest straight compared to a final card of the dealer's longest straight, wherein at least a portion of the number of valueless wagering elements awarded to the player correlates to a difference between the number of cards in the player's longest straight and the number of cards in the dealer's longest straight. Authorization to redeem a valueless access token at the user interaction server from a player who has exhausted the quantity of valueless wagering elements may be received or a determination that the predetermined time period has lapsed for a player who has exhausted the quantity of valueless wagering elements may be made, and another quantity of valueless wagering elements usable within another predetermined time period may be sent from the user interaction server to the player. The resolving of the ante wager and any play wager is based on the evaluation of at most straights and final cards of straights.

In some embodiments, the present disclosure includes additional methods of administering a player-banked wagering game over a network. In accordance with such methods, authorization from players to receive a first pot wager may be received at a user interaction server and an indication that the first pot wagers have been added to a pot may be sent from the user interaction server. Authorization to receive an ante wager from each player may be received at the user interaction server and an indication that the ante wagers have been added to an accumulating second pot separate from the first pot may be sent from the user interaction server. A rake may be transferred from the first pot, the second pot, or both, to an account server. Rank information for a set of player cards allocated to each player may be sent from the user interaction server. Instructions from each player to fold or to place a play wager may be received at the user interaction server. Authorization from at least one player to receive a play wager may be received at the user interaction server and an indication that the play wager has been added to the second pot may be sent from the user interaction server. Rank information for a set of dealer cards may be sent from the user interaction server. A longest straight of each set of player cards and of the set of dealer cards may be evaluated at a game server. The ante and any play wagers may be resolved by comparing at the game server the longest straight of each player who placed ante and play wagers with the longest straight of the set of dealer cards. An entire remaining amount in the first pot may be awarded to the player or players holding the longest straight of all players at the table. This first pot is resolved without considering the dealer's cards. The ante and play wagers may be resolved by awarding at least a portion of the second pot, to a player when the player's longest straight is of a predetermined minimum length. At least a portion of the second pot may be distributed among a plurality of players when a predetermined event unrelated to composition of each set of player cards and the set of dealer cards has occurred.

Further embodiments may include one, some, or all of the following: The acts of the dealer may be carried out by a visual representation of a dealer, the visual representation being generated and/or displayed by a computer. The visual representation may be a virtual person (e.g., an animation), or may be a transmission (e.g., a video) of an actual person. The visual representation may be part of an online gaming experience of the disclosed game. The acts described in this disclosure associated with a dealer, including dealing cards, displaying or turning cards over, receiving or paying bets, or any other actions, may be represented in any way when used in an online environment. For example, the cards associated with a dealer action, described as being dealt or otherwise handled by a dealer, may appear as virtual cards or as transmitted pictures of physical cards. This may include a display of virtual card decks where each deck, individual card, and hand is displayed to an online player in a manner consistent with the game play disclosed herein, but may or may not include a visual representation of a dealer with the cards. Likewise, betting activity may be displayed in any manner to a player, including, but not limited to, virtual chips, betting pools, numbers, or other indicia of a bet amount.

The online experience may involve players playing remotely (e.g., in a different physical location) from the dealer, the location of a game server, or both, interacting through a networked connection that may include, but is not limited to, the Internet. The online game play may involve players who are also physically remote from each other. Remote connections may use networks involving several types of network links including, but not limited to, the Internet. Networked connections allowing physically remote players to play a game using a game server or system may be part of an implementation of a virtual or online gaming environment.

The actions described in this disclosure as the acts of a player, including betting, card selection (if any), card evaluation, card discards (if any), play elections, or any other actions, may be carried out over a network where the indicated actions are received as input to a device. The input-receiving device is typically physically remote from the game server or game host and connected over a long-distance network, but may also be implemented over a wired or wireless LAN in one building, or even in one room, for example. In one embodiment, game play generated at the server or host location may be displayed on the same device as the receiving device. In some embodiments, game play may be conveyed to remote players in devices separate from the devices receiving input from a player, such as public screens or publicly broadcast data about a game coupled with individual or private input devices. The reception of an input at a device may be accomplished through any technology adapted for such a purpose including, but not limited to, keypads, keyboards, touchpads, touch screens, buttons, mice, optical location devices, eye movement/location detectors, sound input devices, etc. When discussing a device, it is understood the device may comprise multiple components and be complex, including hardware components combined with firmware and/or software, and may itself be a subcomponent of a larger system.

Yet other embodiments may comprise apparatuses and systems for administering wagering games according to embodiments of the disclosure.

BRIEF DESCRIPTION OF THE DRAWINGS

While the disclosure concludes with claims particularly pointing out and distinctly claiming embodiments within the scope of the disclosure, various features and advantages of embodiments encompassed by the disclosure may be more readily ascertained from the following description when read in conjunction with the accompanying drawings, in which:

DETAILED DESCRIPTION

Figure 1:
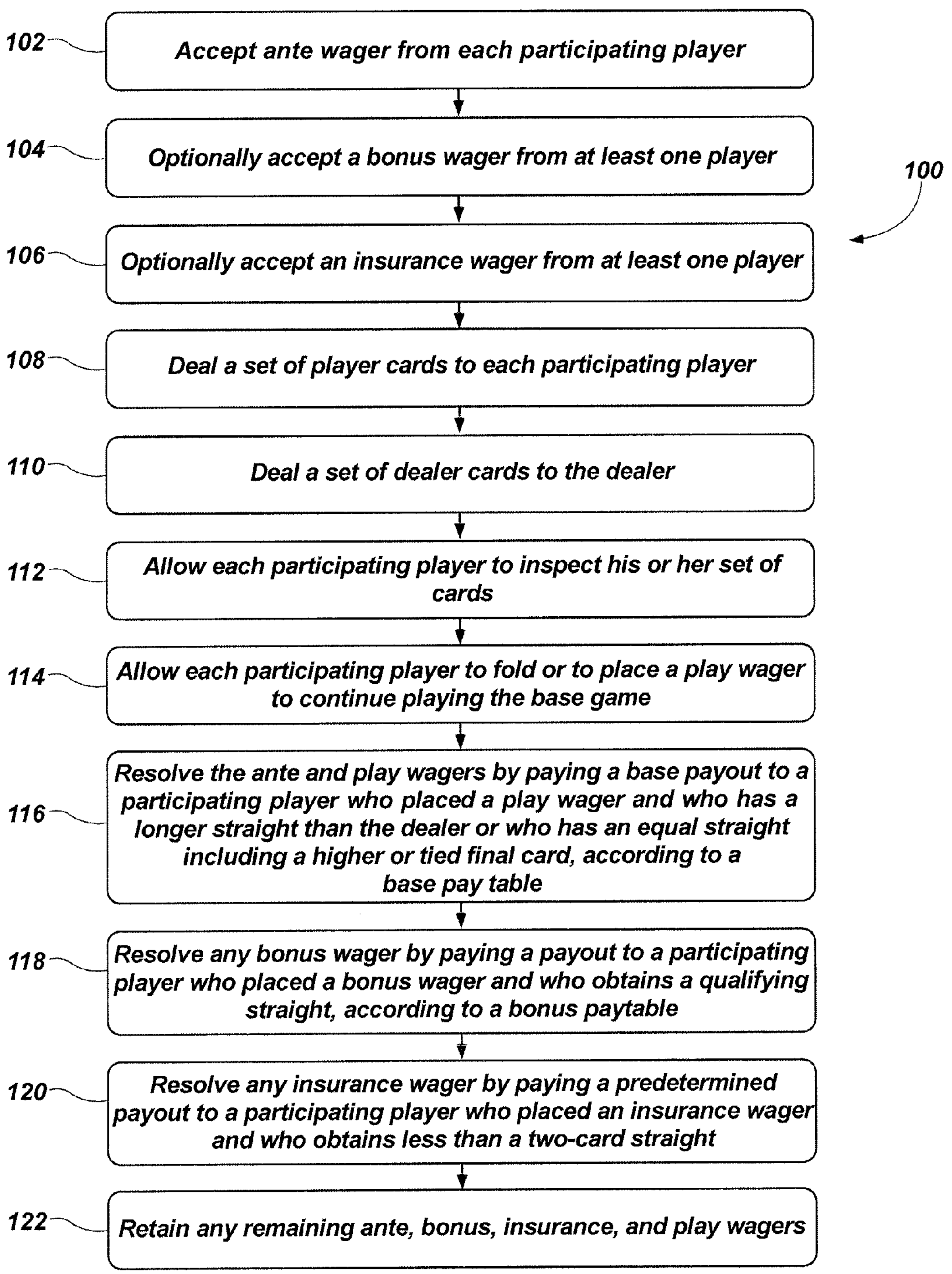
FIG. 1 is a flowchart diagram of a method of administering a wagering game.

The illustrations presented herein are not meant to be actual views of any particular act in a method of administering a wagering game, apparatus for use in administering a wagering game, or component thereof, but are merely idealized representations employed to describe illustrative embodiments. Thus, the drawings are not necessarily to scale. Additionally, elements common between figures may retain the same or similar numerical designation. Elements with the same number, but including a different alphabet character as a suffix should be considered as multiple instantiations of substantially similar elements and may be referred generically without an alphabet character suffix. For example, elements 100*a*, 100*b*, 100*c*, may be a device that is instantiated three times and referred to generically as element 100.

The terms "gaming," "gambling," and the like refer to activities, games, sessions, rounds, hands, rolls, operations, and other events related to wagering games such as web-based games, casino games, card games, dice games, and other games whose outcome is at least partially based on one or more random events ("chance" or "chances"), and on which wagers may be placed by a player. In addition, the words "wager," "bet," "bid," or the like, refer to any type of wagers, bets or gaming ventures that are placed on random events, whether of monetary or non-monetary value. Points, credits, and other items of value may be purchased, earned, or otherwise issued prior to beginning the wagering game. In some embodiments, purchased points, credits, or other items of value may have an exchange rate that is not one-to-one to the currency used by the user. For example, a wager may include money, points, credits, symbols, or other items that may have some value related to a wagering game. Wagers may be placed in wagering games that are "play for pay" as well as "play for free," as will be described in more detail below.

As used herein, the term "wager" includes any form of wagering value, including money, casino chips, other physical means for payment, and online or remote electronic authorization of a wager in any acceptable form to the casino or online or virtual game host. Also included are physical representations of money (e.g., casino chips) at a local gaming table 126, 400, or 500 (see FIGS. 2, 7, and 8), or electronic authorizations of a transfer of money or digital representations of money (e.g., digital representations of bills or coins, digital representations of chips, numerical quantities of money, numerical quantities of points, or numerical quantities of credits) at a local or remote electronic gaming device 300, 400, 500, 620, or 640 (see FIGS. 6 through 10). In "play for fun" embodiments, a "wager" may not have a cash value.

As used herein, the term "card" means and includes a physical playing card, a representation of a playing card (e.g., a digital representation), a game piece, a representation of a game piece, or another element having a relative rank.

As used herein, the term "straight" means a group of cards that are ordered in rank sequentially, with each successive card being exactly one rank above a preceding card in the group. For example, in a conventional 52-card deck of cards, the cards may be ranked as follows, from lowest rank to highest rank: ace, 2, 3, 4, 5, 6, 7, 8, 9, 10, jack, queen, king, and ace. The ace can act as a low card (e.g., having a rank value of less than 2), a high card (e.g., having a rank value higher than a king), or, in some embodiments, both a low card and a high card. In some embodiments, a group of cards may form a so-called "wrap-around straight," such as a four-card straight consisting of the cards king, ace, 2, and 3, for example. The wrap-around function may be offered in connection with the ace acting as highest and lowest card, or when the ace is only the highest or lowest card.

For the purposes of this description, it will be understood that when an action related to accepting wagers, making payouts, dealing cards, selecting cards, or other actions associated with a player or a dealer are described, the description includes a player or dealer taking the action, the results of the action on a live or virtual table or display, and, if applicable, the reception or detection of such an action in an electronic form where player and dealer choices, selections, or other actions are received at an electronic interface. This further includes the results of a virtual dealer and virtual players, where the actions described are actually generated by a computer (typically associated with an online game). By way of a further example, if dealing of a card is described herein, the description includes (but is not limited to): the dealing of a card by a dealer from a deck, shuffler, a shoe or other card source and the reception or placement of the card at a table location associated with a player, or reception directly by a player; the generation and transmission of an electronic indication or representation of a card from a game play source or server to an electronic receiver, where the receiver may be at a table (using virtual cards) including players and/or virtual players and/or a dealer or virtual dealer, at a public display in a casino, at a remote location (e.g., using online or Internet game play), or other locations. Also included is the representation of a card on a display or displays, and, if applicable to the action described, an electronic reception of an indication that the card has been received, selected, or otherwise interacted with at a location associated with a player, or, associated with a virtual player. In addition, dealing of a card may refer to revealing a representation of a card on a scratch-off card (also referred to as "scratchers").

FIG. 1 shows a flowchart diagram of a method 100 of administering a wagering game. Generally, the method 100 includes administering a wagering game in which one or more winners may be determined by comparing straights of at least two sets of cards. The method 100 may begin with the making of an ante bet, accepting an ante bet, or receiving an indication that an ante bet has been made or received from each participating player, or at a location associated with a particular player, as indicated at operation 102. The ante wager may be accepted from each player wishing to participate in the upcoming wagering game (which may represent the start of one game play; a game session may comprise one or more individual game plays).

As a specific, non-limiting example, the individual players may begin a gaming session at an electronic gaming table 126, 400, or 500 (see FIGS. 2, 7, and 8) (e.g., by logging into a player account, by swiping a player account card, or by swiping a credit card) and interact with personal interface devices 332, 416, 532, 620, 640, 650, 654 (see FIGS. 6 through 10) (e.g., touch screens, keyboards, buttons, switches, etc.) to authorize placement of the ante wager. The ante wager may be provided, for example, by placing physical money or physical representations of money (e.g., poker chips) in a designated area of a gaming table 126, 400, 500 (see FIGS. 2, 7, and 8), by displaying digital representations of money in a designated area of at least one display screen 374, 416, 430, 532, 560, 564, or 658 (see FIGS. 6 through 8 and 10), or by displaying a monetary amount of the first wager on at least one display screen 374, 416, 430, 532, 560, 564, or 658 (see FIGS. 6 through 8 and 10), which may be remotely located from a dealer or game server 606 (see FIG. 9).

The ante wager may be accepted, for example, by electronically accepting funds from a player account or other credit authorized via one or more communications media (e.g., via the Internet, wireless communications, landline) on a remote electronic device (e.g., a personal computer, a laptop, a tablet computer, or a smartphone) by player input; electronically accepting funds from a player account authorized on a local wagering game administration device in a casino by player input; or physically placing money or representations of money (e.g., chips) on a table at a live game in a casino. Suitable network architecture for electronically accepting funds from a player account authorized on a remote device may comprise, for example, the network gaming architecture disclosed in U.S. patent application Ser. No. 13/353,194, filed Jan. 18, 2012, now U.S. Pat. No. 9,120,007, issued Sep. 1, 2015 to Costello et al., and U.S. patent application Ser. No. 13/609,031 filed Sep. 10, 2012, now U.S. Pat. No. 8,974,305, issued Mar. 10, 2015 to Costello et al., the disclosure of each of which is incorporated herein in its entirety by this reference. Suitable local wagering game administration devices may comprise, for example, the chipless tables disclosed in U.S. Patent Application Pub. No. 2010/0016050, published Jan. 21, 2010, to Snow et al., now U.S. Pat. No. 8,262,475, issued Sep. 11, 2012, the disclosure of which is incorporated herein in its entirety by this reference.

In some embodiments, optionally, a bonus wager (e.g., a side bet) may be accepted from at least one participating player, as indicated at operation 104. The bonus wager may be accepted before any cards are dealt, or at least before the at least one participating player is allowed to inspect his or her player cards. The bonus wager may include, for example, a wager that the player cards of the at least one participating player will include a straight of a minimum number of cards, such as at least four cards. A straight having an even greater length may qualify the at least one player for a higher bonus payout, as will be explained in more detail below.

In some embodiments, optionally, an insurance wager may be accepted from at least one participating player, as indicated at operation 106. The insurance wager may be accepted before any cards are dealt, or at least before the at least one participating player is allowed to inspect his or her player cards. The insurance wager may include, for example, a wager that the player cards of the at least one player will not include a straight of at least two cards.

After the ante wager and any bonus and/or insurance wagers have been accepted, player cards may be dealt to each participating player, as indicated at operation 108. By way of example and not limitation, seven player cards may be dealt to each participating player, although any predetermined number of cards may be dealt to each participating player as dictated by game or house rules. For example, physical cards that have been randomized (e.g., by manual or automated shuffling) may be distributed sequentially to each participating player, the order of which may be dictated by a set of game or house rules. In additional embodiments, digital representations of cards (e.g., images resembling physical cards or characters and symbols) may be displayed on personal display screens 374, 416, 532, or 658 (see FIGS. 6 through 8 and 10) for individual players. In some embodiments, the electronically generated cards may be displayed, for example, to remote players over networks.

The player cards may be dealt face down and may only be visible to the individual player to whom the set of player cards was dealt. It is understood that "face down" may refer to physical playing cards that are in a face down orientation or digital indications or representations of cards that are not yet revealed to one or more participating players. In other embodiments, one, two, or more of the player cards may be made visible to both the player to whom they were dealt and other participating players, for example, by dealing the player card(s) face up. Further embodiments may involve dealing any predetermined or selected number of cards face up, up to and including all of the cards dealt to each individual player.

Dealer cards, against which each participating player's set of playing cards is to be played, may be dealt face down, such as in front of the dealer, as indicated at operation 110. In some embodiments, one or more of the dealer cards may be dealt face up to provide a perceived or actual advantage to the participating player(s). In some embodiments, the dealer cards may be dealt at the same time as the dealing of the player cards, such as by repetitively adding one card to each participating player card position and to the dealer card position until a predetermined number of cards is given to each participating payer and to the dealer. By way of example and not limitation, at least one more card may be dealt to the dealer than to each participating player to provide an advantage (e.g., a so-called "house edge") to the casino or other establishment providing the game. In other embodiments, the dealer hand holds the same number of cards as the player hands. In yet other embodiments, a random number of cards is dealt to the players, the dealer, or both. For example, in an embodiment in which each participating player is dealt seven cards, the dealer may be dealt eight cards. In some embodiments, the advantage may be provided to the casino or other establishment by allowing a tie to go to the casino or other establishment, by adjusting payout odds in favor of the casino or other establishment, and/or by allowing the casino or other establishment to withhold a portion of every wager, such as by taking a rake (i.e., a certain percentage) of each ante wager. In such embodiments, the dealer may be dealt an equal number of cards as the set of player cards of each participating player. In one embodiment, ties or copies are resolved in the player's favor.

Prior to revealing the dealer cards initially dealt face down, each participating player may be allowed to inspect his or her set of player cards, as indicated at operation 112. After inspecting his or her set of player cards, each participating player may be allowed to fold or place a play wager to continue playing the game, as indicated at operation 114. Thus, a play wager may be accepted from each participating player who decides not to fold. Each of the participating players may decide whether to fold or continue to play based on his or her player cards and whether he or she believes that there is a good chance at achieving a longer straight or at least a tied straight comparing the respective player hand to the dealer hand, as will be explained in more detail below. For example, a participating player that has a relatively long straight (e.g., six consecutive player cards) will likely decide to place a play wager to continue playing, while a participating player with a longest straight that is relatively short (e.g., two consecutive player cards) will likely decide to fold to reduce potential losses.

After each participating player has folded or placed a play wager, the set of dealer cards may be revealed, and the set of player cards of each participating player who placed a play wager may be compared to the set of dealer cards. The ante and play wagers of each participating player who placed a play wager may be resolved based on the comparison, as indicated at operation 116. In one embodiment, both the ante and play wagers are considered base game wagers. For example, each participating player may be paid a payout on the play wager according to a pay table based on a difference between the number of cards in a longest straight of the player's set of player cards and the number of cards in a longest straight of the dealer's set of dealer cards, as will be explained in more detail below. A greater difference between the winning player's longest straight and the dealer's longest straight may entitle the player to a relatively higher payout compared to a lower difference or no difference. In determining the longest straight, any ace card of the straight may act as either a low card (e.g., having a rank value of 1) to form a straight with a 2 card or as a high card (e.g., having a rank value of 1 above a king card) to form a straight with a king card. In additional embodiments, the ace card may act simultaneously as both a low card and a high card to result in the possible formation of a so-called "wrap-around straight." A wrap-around straight may include at least a king, an ace, and a 2.

In the event of a tie, in which a participating player's longest straight includes an equal number of cards as the dealer's longest straight, a predetermined tie breaker may be settled to determine whether or not the participating player qualifies for a payout. As used herein, any phrase such as "equal number of cards" relating to the event of a tie in straight length are intended to include a situation in which the player and the dealer each have no straight (i.e., no two consecutively ranked cards), in which case the predetermined tie breaker may be settled to determine whether the participating player qualifies for a payout. By way of example and not limitation, the ranks of respective final cards of the player's longest straight and of the dealer's longest straight may be compared to settle the tie breaker. As used herein, the "final card" of a straight refers to the lowest ranking or highest ranking card in the straight of cards when the straight of cards is counted sequentially from a bottom of the straight to a top of the straight. For example, the final (high) card of a 4-5-6-7 straight is a 7, while the final card of a 10-J-Q-K straight is a king, which has a higher rank than a 7. In embodiments in which wrap-around straights are allowed, the final card may have a relatively low rank. For example, the final (low) card of a Q-K-A-2 straight is a 2, while the final card of a 3-4-5-6 straight is a 3. The 3-4-5-6 straight would beat the Q-K-A-2 straight (starting with a higher ranked queen) because the final low card of the 3-4-5-6 straight (i.e., a 3) is higher than the final (low) card of the Q-K-A-2 straight (i.e., a 2). If the final cards of the respective player's longest straight and the dealer's longest straight are equal, such as when the player and the dealer each hold a straight of equal rank with cards defining the respective straights having different suits, game rules may indicate the winner of such a tie. In some embodiments, it may be predetermined that such a tie qualifies the participating player to receive a payout or, alternatively, that such a tie results in the casino or other gaming establishment retaining the ante and play wager of the player. In other examples, ties may result in a push of one or more of the ante and play bets. By way of additional examples, the predetermined tie breaker may be settled by comparing highest ranked cards in the respective longest straights of the player and of the dealer or by comparing the player's second longest straight with the dealer's second longest straight. Thus, the ante and play wager of each participating player from whom a play wager was accepted may be resolved by paying (the play wager is paid according to a base pay table, as explained below) a participating player who achieves a longer straight than the dealer or who achieves an equal straight with a predetermined tie breaker settled in the player's favor, and/or by retaining the ante and play wager of the participating player who has a lower longest straight than the dealer or a longest straight of equal length as the dealer's longest straight but who loses the predetermined tie breaker. In one embodiment, when the player holds a winning hand, the dealer pays 1:1 on the ante and pays odds payouts on the play bet for predetermined spreads.

The bonus wager may be resolved according to a bonus pay table and based on whether the set of player cards of each participating player from whom a bonus wager was accepted includes a longest straight of a predetermined minimum number of cards, such as a straight of at least four cards, as indicated at operation 118. A bonus payout may be paid to a qualifying participating player according to a bonus pay table, as will be explained below. If the longest straight of the participating player who paid a bonus wager includes fewer cards than the predetermined minimum number of cards, then the bonus wager of that player may be retained, such as by the casino or other gaming establishment. In some examples, the bonus wager may be resolved independently from the ante and/or play wager and regardless of whether the dealer received a fold election from the participating player or whether the dealer paid the player a payout on the ante and play wagers.

The insurance wager may be resolved based on whether the set of player cards of each participating player from whom an insurance wager was accepted if no two-card or better straights are included in the respective set of player cards, as indicated at operation 120. If a participating player who paid the insurance wager has a set of player cards without a two-card or better straight, then the participating player may be paid a predetermined fixed odds payout. A participating player may qualify for the insurance payout with a set of player cards with one or more pairs, three of a kind, or four of a kind, for example, that does not have any two cards of sequential rank. The insurance wager may be resolved independently from the ante and/or play wager, and an insurance payout will typically be paid when the dealer receives a fold election from the player who decided to discontinue play of the base game.

After the ante wager, bonus wager (if any), insurance wager (if any), and play wager (if any) have been resolved and winning payouts paid to any qualifying participating player(s), any losing ante, bonus, insurance, and play wagers may be retained by the casino or other gaming establishment, as indicated at operation 122. As will be explained in more detail below, alternatively, the operation 122 of retaining the wagers may be replaced by an operation of periodically returning at least a portion of at least one of the wagers to one or more participating players, rather than to the casino or other gaming establishment. For example, any remaining portion of the ante wager may be distributed evenly among the participating players, or the participating player with the longest straight may be paid all of the remaining portion of the ante wager, if any.

Although the method 100 of administering a wagering game illustrated in FIG. 1 has been described as following a particular sequence, the present disclosure is not so limited. For example, the operation 118 of resolving the bonus wager and/or the operation 120 of resolving the insurance wager may, alternatively, be performed after allowing each participating player to inspect his or her set of cards (operation 112) and prior to resolving the ante and play wagers (operation 116). In some embodiments, such as embodiments in which multiple players participate and the individual sets of player cards are to be kept face down and not reviewed by other players until after a decision to fold or place a play wager has been made, the operation 118 of resolving the bonus wager and/or the operation 120 of resolving the insurance wager may be performed after allowing each player to fold or place a play wager (operation 114). Furthermore, the insurance wager may be resolved (operation 120) prior to the bonus wager being resolved (operation 118). Thus, any outstanding bonus wager and/or insurance wager may be resolved at any convenient time during a game round after a bonus wager and/or insurance wager has been accepted from at least one participating player and the at least one participating player has inspected his or her respective set of cards.

Various platforms are contemplated that are suitable for implementation of embodiments of wagering games according to the present disclosure. For example, embodiments of wagering games may be implemented such that a dealer or a processor may receive a wager or an indication of a wager and engage in game play according to the rules of the wagering games. For example, wagering games may be implemented on gaming tables, which may include physical gaming features, such as physical cards and physical chips, and may include a live dealer and a shuffler or shoe. More specifically, a live dealer may deal physical cards, evaluate hands, accept wagers, accept player elections, issue payouts, retain wagers, and perform other administrative functions of game play. Some embodiments may be implemented on electronic devices enabling electronic gaming features, such as providing electronic displays for display of virtual cards, virtual chips, game instructions, pay tables, etc. Some embodiments may include features that are a combination of physical and electronic features.

As an example, embodiments of wagering games may be implemented on an individual gaming device such as a video poker machine for accepting wagers that has a display screen and input devices for enabling game play of the wagering games. Such an individual gaming device may be linked with other gaming devices that may be operated, for example, by other players. Some individual electronic gaming devices may be referred to as an individual player "electronic gaming machine" and may be stationary, such as being located on a casino floor. Other individual electronic gaming devices may be portable devices that may be carried to different locations by the player. Portable devices may include both display of the ongoing game play and input reception for game play by a player, and may be configured for receiving input from a player while the game play is displayed on a public monitor, or other display device. Game play and game outcomes may also be displayed on a portable device.

As previously noted, the present games and rules may be played as a live casino table card game, as a hybrid casino table card game (with virtual cards or virtual chips), on a multi-player electronic platform (as disclosed in U.S. patent application Ser. Nos. 10/764,827; 10/764,994 (now U.S. Pat. No. 7,661,676, issued Feb. 16, 2010); and Ser. No. 10/764,995 (now U.S. Pat. No. 8,272,958, issued Sep. 25, 2012), all filed on Jan. 26, 2004, the disclosure of each of which applications is incorporated herein in its entirety by this reference), on a personal computer for practice, on a hand-held game for practice or on a legally authorized site on the Internet.

In one embodiment, the players may be remotely located from a live dealer and the players may observe the live dealer and a game table on their monitors via a video feed. The players' video feeds may be transmitted to the live dealer and also be shared among the players at the table. In a sample embodiment, a central station includes a plurality of betting-type game devices, and an electronic camera for each game device. A plurality of player stations remotely located with respect to the central stations, each one including a monitor for displaying a selected game device at the central station, and input means for selecting a game device and for placing a bet by a player at the player's station relating to an action involving an element of chance to occur at the selected game device. Further details on gambling systems and methods for remotely located players are disclosed in U.S. Pat. No. 6,755,741 B1, issued Jun. 29, 2004, and titled "Gambling Game System and Method for Remotely-Located Players," the disclosure of which is incorporated herein in its entirety by this reference, and are disclosed in connection with FIGS. 9 and 10 of the present disclosure.

Figure 2:
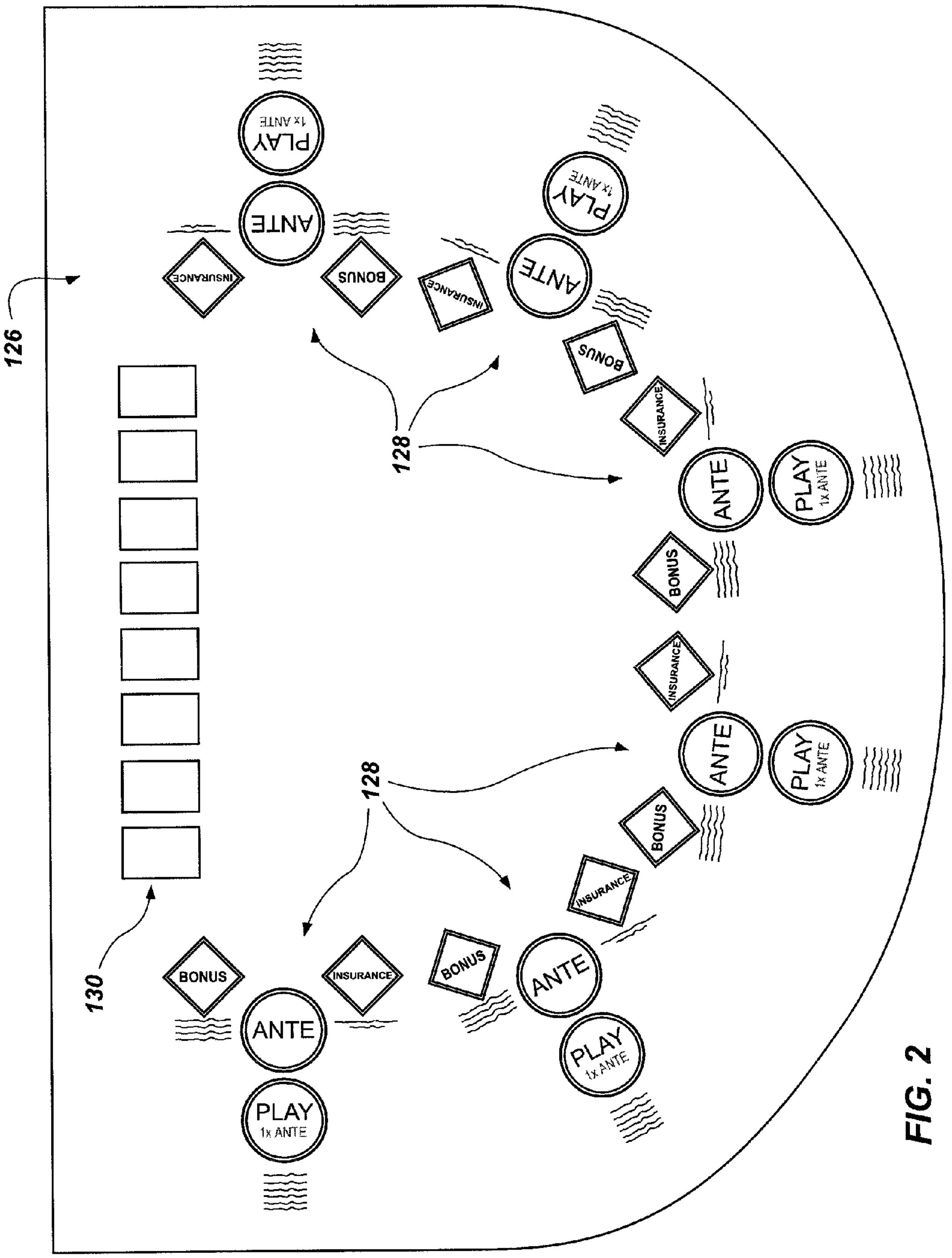
FIG. 2 is a diagram of a playing surface for implementation of the wagering game.

Referring to FIG. 2, a diagram of a playing surface 126 (also referred to as "gaming table 126") having one or more player positions 128 and a dealer card position 130 for implementation of the wagering games within the scope of the present disclosure is shown. Such an implementation may include a felt layout on a physical gaming table 400 or 500 (see FIGS. 7 and 8) or an electronic representation of a felt layout on a video display screen 374, 416, 430, 532, 560, 564, or 658 (see FIGS. 6 through 8 and 10) for each participating player position 128. The playing surface 126 may define a plurality of the participating player positions 128 within which the activity (e.g., wagering and card dealing) for individual players may take place. The dealer card position 130 may be a position where dealer cards may be dealt. For example, the dealer card position 130 may include an area where a number of cards of a dealer hand may be dealt and positioned, such as an area sufficiently large to position eight cards side by side.

Figure 3:
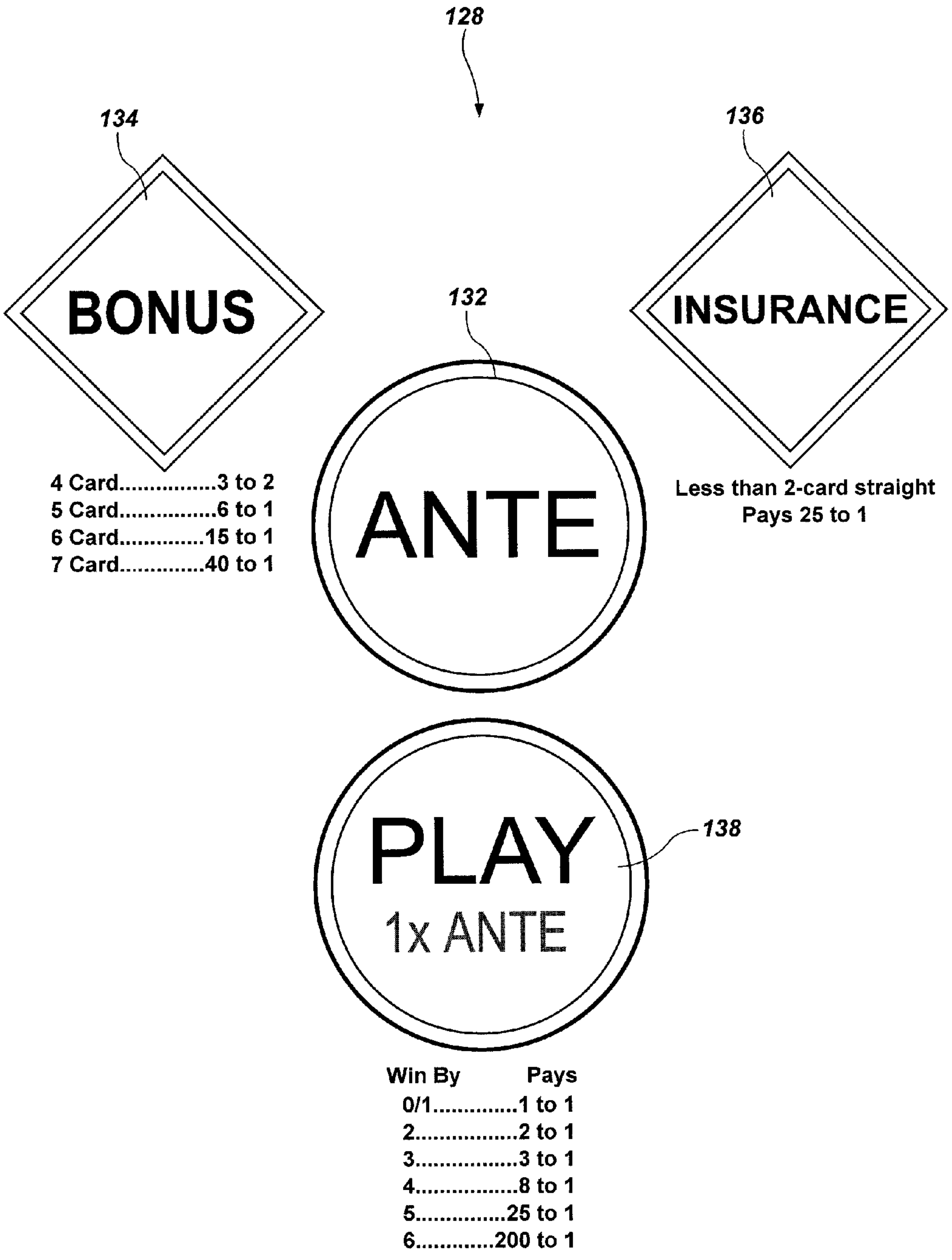
FIG. 3 is an enlarged diagram of one of the player positions of the playing surface of FIG. 2.

Referring to FIG. 3, an enlarged diagram of one of the player positions 128 of the playing surface 126 of FIG. 2 is shown. Each player position 128 may include an ante wager region 132 within which money or representations of money may be placed or displayed when the ante wager is accepted. Each player position 128 may also include a bonus wager region 134 within which a bonus wager may be placed or displayed when the bonus wager is accepted. In addition, each player position 128 may include an insurance wager region 136 within which an insurance wager may be placed or displayed when the insurance wager is accepted. Each player position 128 may also include a play wager region 138 within which a play wager may be placed (e.g., physically positioned or digitally displayed) when the participating player decides not to fold and the play wager is accepted. In some embodiments, one or more of the wager regions may include sensors to automatically sense the presence and/or the value of a wager.

With combined reference to FIGS. 2 and 3, a specific implementation of the wagering game described in connection with FIG. 1 is presented. An ante wager may be accepted from each participating player position 128 by receiving money or representations of money (e.g., chips) in the ante wager region 132. Optionally, a bonus wager may be accepted by receiving money or representations of money in the bonus wager region 134. For example, the dealer may accept an optional bonus wager in region 134. After the ante wager and, optionally, the bonus wager and/or the insurance wager have been accepted by placing the wagers in the respective positions, a number of player cards (e.g., seven player cards) may be dealt to a player card position (e.g., below the player position 128 in the perspective of FIG. 3) of each participating player position 128. In some embodiments, the seven player cards may be dealt face up, while in other embodiments the seven player cards may be dealt face down. In further embodiments, one or more player cards may be dealt face up, while one or more additional player cards of the seven may be dealt face down. Eight dealer cards may be dealt to the dealer card position 130, face down. In some embodiments, one or more dealer cards of the eight dealer cards may be dealt face up, to provide the player with a perceived or actual advantage of knowing the identity of one of the dealer cards.

After allowing each participating player to inspect his or her set of player cards, referring to FIGS. 1 through 3, the dealer may receive an election from each participating player to fold and surrender any outstanding ante wager or receive a play wager in the underlying or base game. The dealer compares a longest straight of the player hand with a longest straight of the dealer hand. In addition, the dealer evaluates a folding player hand from whom an insurance wager was accepted in the insurance wager position 136. The dealer pays an insurance bet payout when the player's hand qualifies for an insurance payout.

For example, the dealer may receive an indication from the player that he or she wishes to fold by observing the player passing his or her respective player hand, face down, on the playing surface 126 above the player's player position 128 and toward the dealer. If the player hand does not have at least a two-card straight and the player previously placed an insurance wager in the insurance wager position 136, the player may place his or her player hand, face down, under the insurance wager in the insurance wager position 136. The dealer verifies that the lack of a two-card run condition is present and the insurance wager should be paid to the player at the conclusion of the round of play. The positioning of the player hand under the insurance wager may also indicate to the dealer a fold election and that the player wishes to surrender the ante wager. If a participating player decides to continue play, the dealer may accept a play wager placed by the player in the play wager position 138. In some embodiments, the allowable amount of the play wager may be equal to the ante wager. In other embodiments, the play wager may be a specific multiple of the play wager, may be selected from a group of allowable multiples of the play wager, or may be any amount with or without an upper and/or lower limit, but within table limits. After the dealer has received fold or continue play election by receiving a play wager, the face down dealer cards in the dealer card position 130 may be revealed.

After the dealer cards are revealed, the set of player cards of each participating player that placed a play wager may be compared to the dealer cards to decide whether the respective player hands include a straight having a number of cards greater than a longest straight formed from the dealer cards. A difference between a number of cards of the player's longest straight and a number of cards in the dealer's longest straight may be referred to herein as a "margin of victory." In some embodiments, when a player's longest straight is equal in length to the dealer's longest straight (i.e., resulting in a margin of victory of zero) a predetermined tie breaker may be settled to determine whether or not the player wins and qualifies for a payout. For example, the player's longest straight and the dealer's longest straight may be evaluated to determine whether the final card of the player's longest straight is higher than or of equal rank to the final card of the dealer's longest straight, as explained above. By way of another example, the player's longest straight and the dealer's longest straight may be evaluated to determine whether a highest ranked card in the player's longest straight has a higher or equal rank to a highest ranked card in the dealer's longest straight. In yet another example, settling the predetermined tie breaker may include comparing a player's second longest straight with a dealer's second longest straight. After the dealer's longest straight and each player's longest straight are compared and the tie breaker (if any) is settled, the ante wager and the play wager may be resolved according to a base pay table. By way of example and not limitation, the play wager may be resolved, and a fixed odds payout paid, according to the following base pay table, which is based on each set of player cards having seven cards and the set of dealer cards having eight cards:

| Margin of Victory | Base Payout |
|---|---|
| 6 | 200 to 1 |
| 5 | 25 to 1 |
| 4 | 8 to 1 |
| 3 | 3 to 1 |
| 2 | 2 to 1 |
| 1 | 1 to 1 |
| 0, with tie breaker | 1 to 1 |

The pay table for resolving the play wager may be independent from the bonus pay table for resolving the bonus wager and from the insurance payout for resolving the insurance wager. In some embodiments, the payout odds according to the pay table above may include returning the original ante and play wagers initially accepted from the winning participating player. In other embodiments, the payout odds according to the bonus pay table above may be in addition to returning the original bonus wager initially accepted from the winning participating player. In such embodiments, the original bonus wager may be returned to a participating player that holds the longest 5-card straight, and an additional 6 times the original bonus wager (or another payout based on the particular pay table used) may be paid. If a participating player does not achieve a winning hand, any portion of that participating player's ante and play wagers that remains in play may be collected and retained by the dealer.

Optionally, the bonus wager of each participating player who has placed a bonus wager in the bonus wager region 134 may be resolved according to the set of player cards of that player. By way of example and not limitation, the bonus wager may be resolved, and a fixed odds payout paid, according to the following bonus pay table, which is based on each set of player cards having seven cards:

| Longest Straight | Bonus Payout |
|---|---|
| 7 cards | 40 to 1 |
| 6 cards | 15 to 1 |
| 5 cards | 6 to 1 |
| 4 cards | 3 to 2 |

The bonus payout may be paid to any participating player who has elected to make the bonus wager prior to receiving and/or inspecting his or her player cards and who holds a qualifying set of player cards according to the bonus pay table. For any participating player that does not hold a player card hand with at least a four-card straight, that participating player's bonus wager may be retained by the dealer and/or house.

Optionally, the insurance wager of each participating player who has placed an insurance wager in the insurance wager region 136 and folded by placing his or her player hand under the insurance wager may be resolved by examining the set of player cards of that player to determine whether at least a two-card straight is not achieved. By way of example and not limitation, the insurance wager may be resolved by paying a fixed odds payout of 25 to 1 to a participating player with a player hand that does not achieve at least a two-card straight. Other odds payouts such as payouts ranging from 10:1 to 40:1 are contemplated.

After any remaining portions of the ante, bonus, insurance, and play wagers are resolved and payouts (if any) are paid and/or wagers collected and retained, the player cards and dealer cards may be collected and the game round ended.

In some embodiments, the play bet pay table, the bonus pay table, insurance fixed odds payout, and/or the combinations thereof, may be adjusted based on a number of cards or decks of cards used in the game play. Thus, the game may be played with any number of cards or decks of cards, such as with a single 52-card deck, two 52-card decks, three 52-card decks, four 52-card decks, etc. Given the number of cards or decks of cards, the bonus pay table may be adjusted based on the odds of obtaining the winning hand(s). Thus, a card shuffler, dealing shoe, stack, or digital file containing any number of cards or representations of cards may be used with embodiments of the present disclosure.

The method 100 of administering the game of the present disclosure, as described above with reference to FIGS. 1 through 3, may be based solely on the occurrence, non-occurrence, length, and/or comparative length (i.e., the number of cards in a straight) of straights. Thus, other conventional poker card combinations, such as full house, pair, three of a kind, flush, etc., may be disregarded in administering the game of the present disclosure. It is understood that the phrase "solely straights" and related phrases, as used herein, may include the consideration of the final card or a highest ranked card of the straight in a predetermined tie-breaking situation, as described above.

In some embodiments, the wagering games described herein may be played against the house (i.e., be "house-banked"), which may involve playing against a dealer hand or a pay table, with payouts on wagers being paid by a casino or other gaming establishment and losses on wagers being collected by the casino or other gaming establishment. For example, the embodiment described above with reference to FIGS. 1 through 3 has been described as being played in a house-banked format. In other embodiments, the wagering games, or at least one wager associated with the wagering game, may enable players to play against one another (i.e., be "player-banked" or "player-pooled"), with payouts on wagers being paid from a pot and losses on wagers being collected into the pot and eventually distributed to one or more players.

Figure 4:
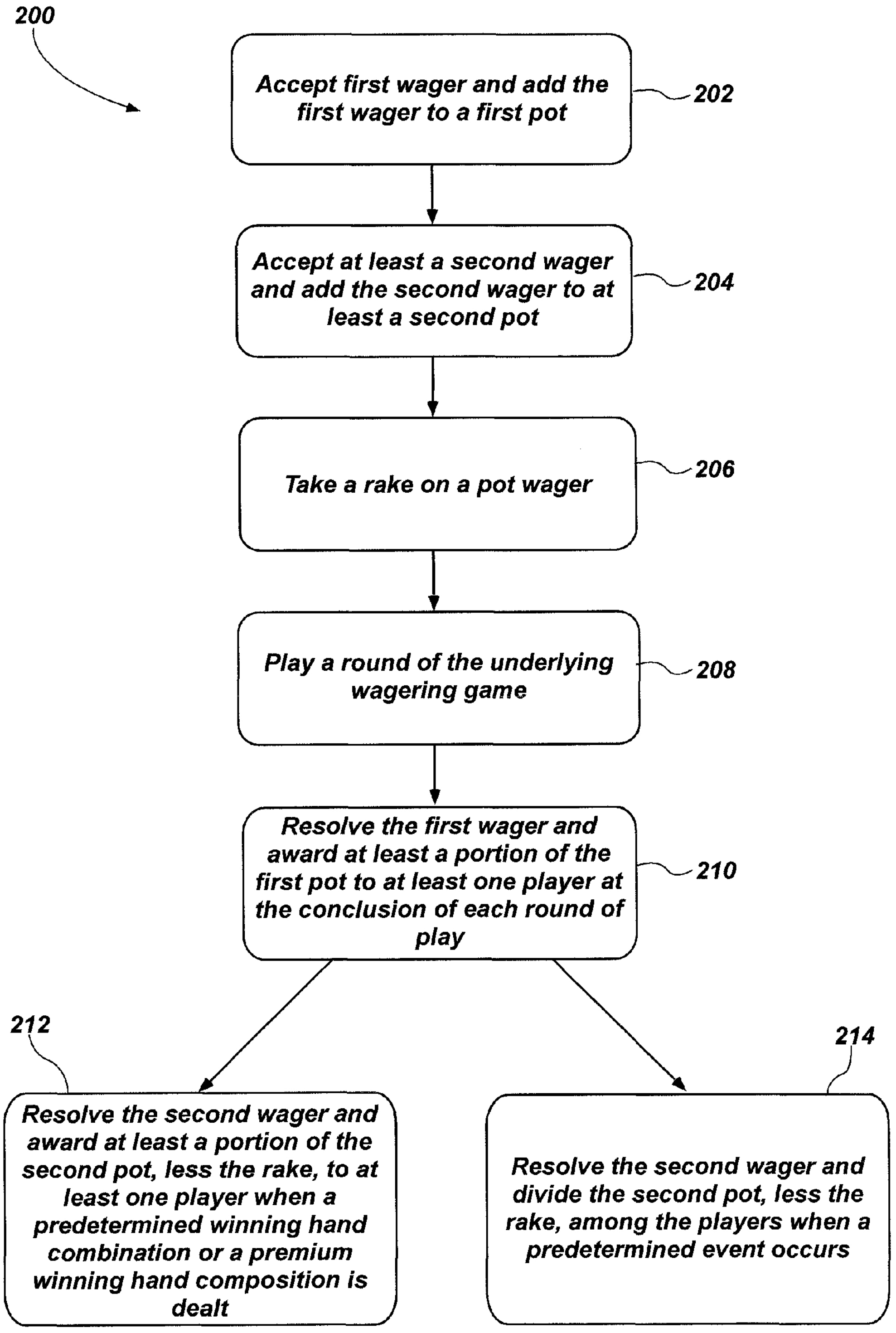
FIG. 4 is a flowchart diagram of a method of administering a wagering game that may be at least partially player-banked.

Referring to FIG. 4, a flowchart diagram of a method 200 of administering a wagering game, which may be at least partially player-banked, is shown. The method 200 includes accepting a first mandatory wager such as a poker pot wager, as indicated at operation 202. The poker wager is resolved by comparing player hands and awarding the poker pot to the player with the longest straight. The dealer accepts a second wager that accumulates in a second pot, as indicated in operation 204. The second wagers may comprise, for example, a base game wager (e.g., antes, blinds, play bets, raises, and other bets made on the underlying wagering game) or a side wager. More specifically, the second wager may comprise, for example, the ante wager and the play wager described above with reference to FIGS. 1 through 3. The second wager may be accepted, for example, by performing any of the acts described previously in connection with FIG. 1.

A third wager may be accepted and added to at least a third pot. The third pot may be separate from the second pot. For example, the second and third pots may include chips located in separate areas on a gaming table when the wagering game is conducted live in a casino. As another example, the first, the second and third pots may be displayed as separate amounts on one or more of video display screens 374, 416, 418, 430, 532, 560, 564, and 658 (see FIGS. 6 through 8 and 10) (e.g., a monitor) controlled by one or more of processors 350, 414, 428, 597, and 642 (see FIGS. 6 through 8 and 10) and may be maintained in separate accounts when the wagering game is conducted online. The third wager may enable a player to be eligible to win an additional award, such as, for example, a progressive payout (e.g., a progressive jackpot awarded to one or more qualifying players). The second pot may accumulate between rounds of play, and to periodically reduce the balance, a dividend (e.g., a share of the second pot awarded to each participating player), may be awarded to players from the second pot. The third wager may alternatively comprise, for example, the bonus wager described above, the insurance wager described above, a separate pot side wager, or any combination thereof.

In some embodiments, the third wager may be a mandatory wager. In other embodiments, the third wager may be optional, and a player wishing to play the wagering game may do so without placing the third wager and without being eligible to win any award from the second pot. In some embodiments, the third wager may include multiple sub-wagers. For example, the third wager may include a first pot wager, which may be added to a non-progressive pot, and a second pot wager, which may be added to a progressive pot. Such pots may be separate from one another and separate from the second pot. The third wager may be accepted, for example, by performing any of the acts described above in connection with FIG. 1.

In some embodiments, the third pot may be a pooled or linked pot. For example, the third pot may include second wagers accepted from multiple concurrent wagering games, which may include only third wagers from those wagering games currently being played or may include accumulated third wagers from past wagering games. As specific, nonlimiting examples, the third pot may include all third wagers accepted from a group of tables or local wagering game administration devices at a casino, from multiple groups of remote devices connected to network gaming architecture, or both. In other embodiments, the third pot may not be pooled, and awards for the third wager may be limited to the amounts wagered at a respective table, local wagering game administration device, or group of remote devices.

A rake (e.g., a commission for the house, such as a percentage of one or more wagers) may be taken on at least one wager, as indicated at operation 206. Alternately, a rake may be taken on all wagers, or any wager, such as the second wager. For example, the house may collect a portion of the second wager at the time the second wager is placed or may collect a portion of amounts awarded from the second pot at the time the second pot or a portion of the second pot is awarded. The rake may comprise, for example, a fixed percentage of the second wager. More specifically, the percentage of the second wager collected for the rake may be, for example, greater than a theoretical average house advantage for the underlying game. As another example, the rake may be less than an average house advantage for play of the wagering game by all players, including average and sub-average players, which may be calculated using a historical house advantage for the wagering game (e.g., a house advantage for the wagering game over the last 5, 10, or 15 years for a given casino or other gaming establishment) or using a statistical analysis. As specific, nonlimiting examples, the percentage of the second wager collected for the rake may be between 3% and 8%, between 4% and 7%, or between 5% and 6%. In other embodiments, the portion of the second wager collected for the rake may comprise a variable percentage of the second wager or may comprise a fixed quantity (e.g., a flat fee) irrespective of the total amount for the second wager, a fixed percentage with a cap, or a time-based fee for increments of time playing the wagering game.

All profits for the house may be made from the rake in some embodiments. In such embodiments, wagers in excess of the rake may be redistributed back to the players, rather than be collected by the house as additional revenue. Such limiting of profits for the house and redistribution of second wagers back to the players may increase the attractiveness of the wagering game to both inexperienced and highly skilled players. Because the amount earned by the house is known, highly skilled players may perceive that their skill will enable them to increase winnings, and inexperienced players may be enticed by the possibility of winning the second pot or a portion thereof. In other embodiments, the house may make profits on the rake and on losses from one or more of the wagers (e.g., losses from one or more of the ante wager, the bonus wager, the insurance wager, and the play wager), including losses resulting from optimal and suboptimal play. The rake may be maintained in a rake account, and profits for the house may be deducted from the rake account. The rake may be taken by, for example, electronically transferring funds from the second pot to a rake account (e.g., as instructed by a game server 606 (see FIG. 9) using casino account servers 610 (see FIG. 9)) or physically removing or exchanging money or representations of money from the second pot on a live table.

A round of the underlying wagering game may be played, as indicated at operation 208. For example, the underlying wagering game may be played at least substantially as described previously in connection with FIGS. 1 through 3.

At the end of a round of play, the first wager may be resolved and the first pot may be awarded to at least one player, as indicated at operation 210. Each successive round of making wagers, dealing cards, and resolving wagers may constitute a round of play, and the first pot may be awarded to at least one player at the end of each round of play. The player to whom the first pot is awarded may hold a highest ranking straight amongst other players at the table. Awarding the first pot or the portion of the first pot may comprise crediting a player account of each wining player or may comprise distributing physical money or physical representations of money to each winning player.

In some embodiments, an entire amount of the first pot may be awarded to at least one player at the end of each round of play. For example, the entire amount of the first pot may be awarded to the at least one player who has a longest straight. In such embodiments, the first pot may be a non-progressive pot. Awarding the entire first pot to at least one player at the end of each round of play may enable the wagering game to qualify as a legal form of online gambling under some relevant statutes. For example, in games that require a mandatory pot bet that has no house advantage, and all other bets go into a second pot that is raked, the game may qualify as a recognized version of "poker" to gaming authorities, especially for online versions of the games. Awarding the entire amount of a pot to at least one player at the end of each round of play redistributes lost first wagers attributable to suboptimal play to other players, rather than to the house. Accordingly, such a wagering game may be particularly attractive to players who perceive themselves as being highly skilled in the wagering game and, therefore, more able to take advantage of suboptimal play by other players.

In some embodiments, a portion of the first pot may be awarded to at least one player at the end of each round of play, and another portion of the first pot may be retained by the house. For example, the portion of the first pot may be awarded to the at least one player who has a longest straight, and the house may take a rake on the first wager, which may still enable the wagering game to qualify as a legal form of online gambling under some relevant statutes. The rake taken may comprise, for example, between 1% and 8%, between 2% and 6%, or between 3% and 5% of the first wager. The rake amounts on each wager may be more than, less than, or equal to the rake taken on other wagers in some embodiments. In still other embodiments, a portion of the first pot may remain in the first pot or be redistributed to another pot (e.g., the second pot) to be awarded in a subsequent round of play as a progressive payout or a dividend distribution. In such an example, the portion of the wager remaining in the first pot or redistributed to another pot may comprise, for example, a fixed percentage of the first wager, a variable percentage of the first wager (e.g., an odds payout may be awarded and the remainder retained in the first pot or redistributed to the other pot), or a fixed amount.

In lieu of, or in addition to, a rake taken on one or more wagers or from winnings, the house may be compensated in a number of other ways, including, without limitation, a flat fee per round of play, a percentage of wagers made with or without a cap, rental of a player "seat," or otherwise as is known in the gaming art. All such compensation may be generally referred to as a commission.

In embodiments where the second pot is a progressive pot, at least a portion of the second pot may be awarded to at least one player when a predetermined winning hand combination is dealt, as indicated at operation 212, or when a premium winning hand composition is dealt, as indicated at operation 212. For example, a game may pay a progressive payout for a 7-card suited straight. The second pot may not be awarded at the end of each round of play, but may grow during each successive round in which no player is dealt a predetermined winning hand combination or a premium winning hand composition. Awarding the second pot or a portion of the second pot may comprise crediting a player account with funds from the second pot or may comprise distributing physical money or physical representations of money from the pot to the player. In some embodiments involving a no-house-advantage first pot awarded at the end of each round and a progressive second pot that receives all other game bets, all players participating in the wagering game who have made the second pot wager may be eligible to win the second pot or a portion of the second pot. Players who are ineligible to win the first pot, and players who have folded but still have one or more other active bets in play, may be eligible to win the second pot or a portion of the second pot.

A predetermined winning hand combination may comprise, for example, a straight of a minimum length, such as a straight of at least four cards, a straight of at least five cards, or a straight of at least six cards. The hands qualifying as new winning hand combinations may be predetermined at the beginning of each round of play in some embodiments. In other embodiments, new winning hand combinations may be predetermined at the beginning of play and may remain fixed until at least one player achieves a predetermined winning hand combination, at which time new winning hand combinations may be predetermined. In still other embodiments, the hand combinations qualifying as winning hand combinations may be predetermined at the outset of the wagering game and remain fixed for the duration of the wagering game. The hands qualifying as winning hand combinations may be predetermined at random from a list of possible winning hand combinations, from among a schedule with a fixed rotation of possible winning hand combinations, or using a fixed table of winning hand combinations.

A premium winning hand composition may comprise, for example, a straight of at least five cards or a straight of at least six cards. The hand compositions qualifying as premium winning hand compositions may remain fixed throughout the duration of the wagering game or may change during the wagering game. For example, after a player has achieved a premium winning hand composition, the hand compositions qualifying as premium winning hand compositions may be made more restrictive or less restrictive. As a specific, non-limiting example, after a player has achieved a straight of at least five cards, the hand compositions qualifying as premium winning hand compositions may be restricted to a straight of at least six cards or may be expanded to include a straight of at least four cards. The hands qualifying as premium winning hand compositions may be predetermined at random from a list of possible premium winning hand compositions, following a schedule with a fixed rotation of possible premium winning hand compositions, or according to a fixed table of premium winning hand compositions.

In embodiments where the second pot is a progressive pot, the amount awarded from the second pot for achieving a premium winning hand composition may be a progressive payout at least as great as a maximum progressive payout for achieving a predetermined winning hand composition. For example, the entire second pot may be awarded when a player or multiple players are dealt a premium winning hand composition, and only a portion of the second pot may be awarded when a player or multiple players are dealt a predetermined winning hand combination that is not a premium winning hand composition.

In embodiments where payouts from the second pot comprise dividend distributions, the second pot, less the rake, may be distributed among a plurality of players upon the occurrence of a predetermined event, as indicated at operation 214. The predetermined event may not be based, for example, on player skill or chance events (e.g., hand composition) occurring in the underlying wagering game. The predetermined event may comprise, for example, at least one player participating for a predetermined number of hands; completing a predetermined number of rounds of play at a given table, electronic gaming machine, or remote gaming device; reaching a predetermined time limit since play commenced; or reaching a predetermined amount within the second pot.

The dividend distributions may be divided at least among players currently participating in the wagering game. In some embodiments, the dividend distributions may also be paid to players who previously contributed to the second pot, but have since ceased participating in the wagering game. In some embodiments, the dividend distributions may not be paid to players who have not contributed to the second pot since the last dividend distribution was paid. The percentage of the second pot, less the rake, paid to each player as a dividend distribution may be, for example, approximately equal to the percentage of hands won by each player, the percentage of first pot winnings won by each player, the percentage of total amounts wagered by each player, the proportional number of wagers made by each player, the proportional length of time spent playing the wagering game by each player, or an equal percentage for each player eligible to receive a dividend distribution from the second pot.

Alternatively, the second pot and/or any other pots may be distributed (wholly or partially) in response to a predetermined event or condition. The predetermined event or condition may be time-based, pot-based (or pool-based), game-based, or other. Further details on pot distributions based on predetermined events and conditions are disclosed in the U.S. patent application Ser. No. 13/871,824, filed Apr. 26, 2013, and titled "Distributing Supplemental Pot in Wagering Games Based on Predetermined Event," the disclosure of which is incorporated herein in its entirety by this reference.

In some embodiments, the second pot may be seeded with money from the rake account or a reserve account at the beginning of play, after the second pot or a portion of the second pot has been awarded, or both. In some embodiments, a minimum account balance sufficient to cover expected losses is retained after a dividend refund such that no seed money is required in the second pot. For example, the second pot may be seeded from the rake account of the house, and the house may maintain an amount of funds in the rake account sufficient to significantly reduce (e.g., to essentially eliminate) the likelihood that any payouts made from the rake account and any seeding amounts withdrawn from the rake account exhaust or overdraw the rake account. In some embodiments, a casino reserve account may be provided to fill the rake account in the event of an overdraw. Such seeding may incentivize players to participate in the wagering game, and specifically to place the second wager to be eligible for the second pot. In addition, such seeding may reduce the likelihood that the amount of funds in the second pot may be insufficient to cover all the payouts to players. For example, where a player achieves a premium winning hand composition in one round of play, or a player achieves a predetermined winning hand combination in the immediately following round of play, and a fixed odds payout is to be awarded to the player holding the predetermined winning hand combination, the amount seeded to the second pot between those rounds of play may be at least as great as the maximum fixed odds payout awardable for any predetermined winning hand combination. The second pot may be seeded each time the second pot is awarded in its entirety or each time the amount in the second pot is lower than the maximum fixed odds payout.

Figure 5:
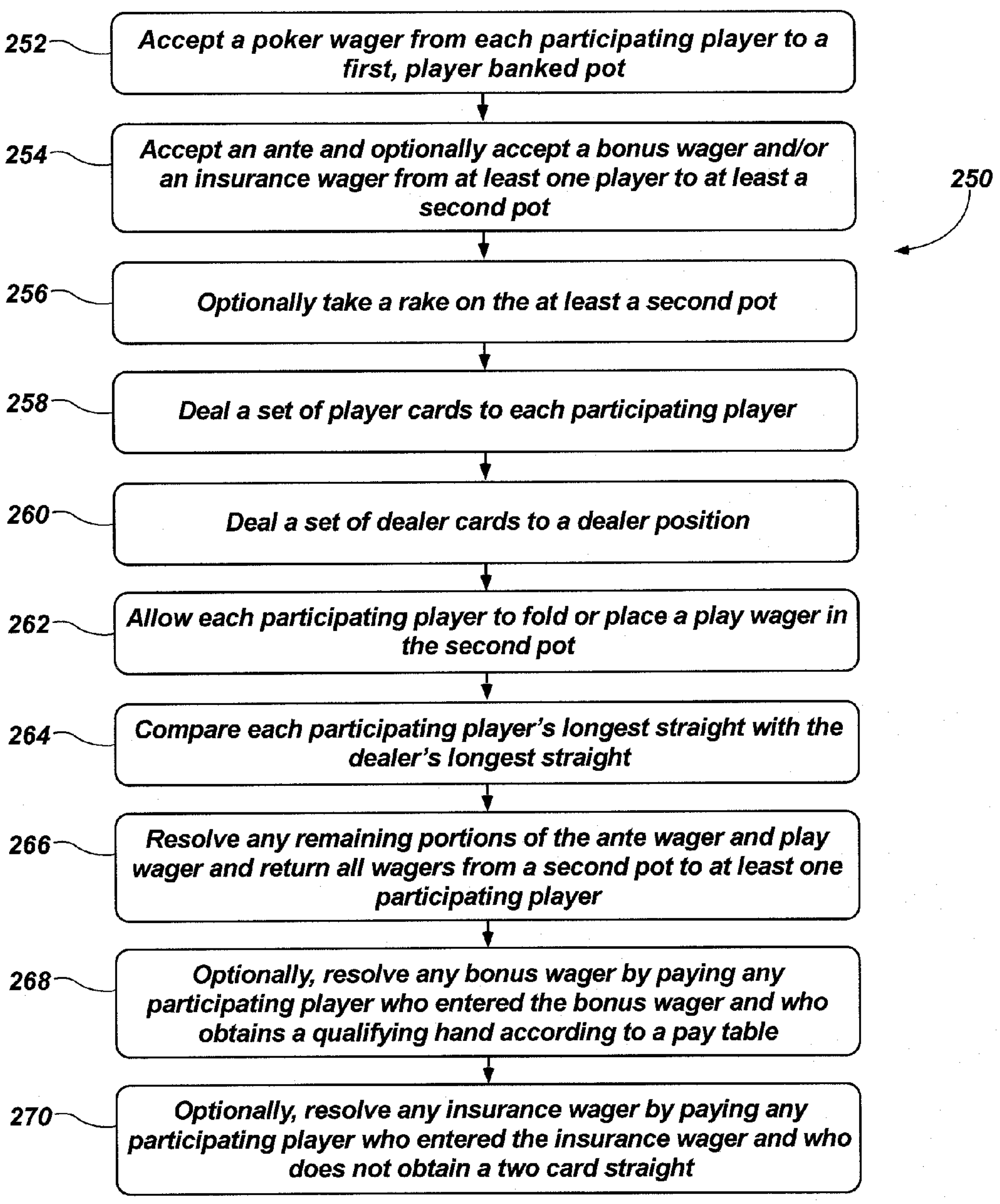
FIG. 5 is a flowchart diagram of another embodiment of administering a wagering game that may be at least partially player-banked.

As a specific, nonlimiting example, a flowchart diagram of a method 250 of administering a player-banked wagering game is illustrated in FIG. 5. The method 250 of FIG. 5 may include the performance of operations similar to those discussed above with reference to FIGS. 1 through 3, but wherein at least one of the wagers (e.g., the ante and play wagers) may be accepted in a first, player-banked pot with no house advantage or rake taken from the first, player-banked pot, as described above with reference to FIG. 4.

Referring to FIG. 5, a non-progressive poker wager may be accepted from each participating player to a first, player-banked pot, as indicated at operation 252. This pot may be raked or may not be raked. The first pot may have no house advantage and the player makes an ante and a play wager that go into a second pot. In addition, the participating players may be given an opportunity to place a bonus wager and/or an insurance wager, as described above with reference to FIGS. 1 through 3. Thus, optionally, a bonus wager and/or an insurance wager may be accepted from at least one player to at least a second pot, as indicated at operation 254. In some embodiments, the bonus wager may be accepted to a second pot and the insurance wager may be accepted to a third pot separate from the second pot. In other embodiments, the bonus wager and the insurance wager may both be accepted to the same second pot. The house may, optionally, take a rake on the at least a second pot, as indicated at operation 256. The at least a second pot may be a progressive pot, as described above with reference to FIG. 4.

With continued reference to FIG. 5, a set of player cards may be dealt to each participating player, as indicated at operation 258, and a set of dealer cards may be dealt to a dealer position, as indicated at operation 260. By way of example and not limitation, each set of player cards may be formed of seven cards and each set of dealer cards may be formed of eight cards, as described above. In other embodiments, each set of player cards may be formed of the same number of cards (e.g., seven cards) as the set of dealer cards.

Before revealing the dealer cards to each participating player, the dealer may accept a fold election to surrender his or her cards and ante wager or may accept a play wager in the second pot to continue play of the base game, as indicated at operation 262 of FIG. 5, and essentially as described above with reference to FIGS. 1 through 3, for example.

After each participating player has been allowed to fold or place a play wager, the set of player cards of each participating player who placed a play wager may be evaluated to compare the player's longest straight with the dealer's longest straight, as indicated at operation 264. The comparison may be performed to determine whether the player's longest straight is longer than the dealer's longest straight and by what margin of victory. In addition, if the player's longest straight has the same number of cards as the dealer's longest straight, then a predetermined tie breaker may be settled, as explained above.

Any remaining portions of the ante wagers and play wagers may be resolved by paying a payout to a player holding a winning straight, according to a pay table, such as the base pay table described above, from the second pot, as indicated at operation 266. In addition, if there are any remaining wagers or portions thereof in the second pot and a qualifying event occurs, all or part of such wagers may be returned to at least one participating player. In one nonlimiting example, the player holding the longest straight may be paid all remaining wagers or portions thereof from the second pot. In another example, any player who holds a straight of a minimum length (e.g., 3 cards), may be paid a portion of the remaining wagers or portions thereof in the second pot. In yet another example, all players who placed at least a play bet may be paid a portion of the remaining wagers or portions thereof in the second pot. Accordingly, the first pot may be emptied and any wagers or portions thereof returned to at least one participating player at the end of each game round. The house rakes the first pot in one embodiment.

Optionally, if any bonus wager was accepted, the bonus wager may be resolved, as indicated at operation 268. The bonus wager may be resolved by paying any participating player who entered the bonus wager and who obtains a qualifying hand according to a pay table, as discussed above. For example, a hand that includes at least a four-card straight may be a qualifying hand for purposes of resolving the bonus wager. The bonus payouts are paid from the second pot in one embodiment.

Optionally, if any insurance wager was accepted, the insurance wager may be resolved, as indicated at operation 270. The insurance wager may be resolved by paying any participating player who entered the insurance wager and who does not obtain at least a two-card straight, as discussed above. The insurance wager payout is made from the second pot in one embodiment.

The method 250 illustrated in FIG. 5 and explained above may be implemented, for example, using physical cards, over a computer network (e.g., online, over a wide area network, or over a local area network), at an electronic or semi-electronic system, or using any one of the other platforms described in the present disclosure.

As another specific, nonlimiting example, a method of administering a player-banked wagering game may be similar to the method 250 described above with reference to FIG. 5, except that the at least a second pot into which any bonus and/or insurance wager is accepted may be a progressive pot that is used to provide a dividend distribution upon the occurrence of an event. By way of example and not limitation, the event that triggers a dividend distribution from the at least a second pot may be unrelated to a composition of the player and/or dealer hands. By way of example and not limitation, a dividend distribution may be provided upon a certain number of game rounds being played, upon a predetermined amount of wagers being reached in the at least a second pot, upon a predetermined time of game play, upon at least one participating player playing at a given table or on a given device, etc.

In some embodiments, wagering games may be played without risking money in connection with the wagers (i.e., "play-for-free" games). Access to play-for-free wagering games may be granted on a time period basis in some embodiments. For example, upon initially joining the wagering game, each player may automatically be given valueless wagering elements, such as, for example, chips, points, or simulated currency, that is of no redeemable value. As used herein, the term "valueless" means having no or inconsequential monetary value. After joining, the player may be free to place bets using the wagering elements and a timer may track how long the player has been participating in the wagering game. If the player exhausts his or her supply of the wagering elements before a predetermined period of time has expired, the player may simply wait until the period of time passes to rejoin the game and receive another quantity of the wagering elements to resume participation in the wagering game.

In some embodiments, a hierarchy of players may determine the quantity of wagering elements given to a player for each predetermined period of time. For example, players who have been participating in the wagering game for a longer time, who have played closest to optimal strategy for the game, who have won the largest percentage of wagers, who have wagered the most in a play-for-pay environment or who have won the largest quantities of wagering elements from their wagers may be given more wagering elements for each allotment of time than players who have newly joined, who have played according to poor strategy, who have lost more frequently, or who have lost larger quantities of wagering elements. In some embodiments, the hierarchy of players may determine the duration of each allotment of time. For example, players who have been participating in the wagering game for a longer time, who have played closest to optimal strategy for the game, who have won the largest percentage of wagers, or who have won the largest quantities of wagering elements from their wagers may be given shorter allotments of times to wait for an award of more wagering elements than players who have newly joined, who have played according to poor strategy, who have lost more frequently, or who have lost larger quantities of wagering elements. In some embodiments, players who have not run out of wagering elements after the period of time has expired may have the balance of their wagering elements reset for a subsequent allotment of time. In other embodiments, players who have not run out of wagering elements may retain their remaining wagering elements for subsequent allotments of time, and may receive additional wagering elements corresponding to the new allotment of time to further increase the balance of wagering elements at their disposal. Players may be assigned to different categories of players, which determine the number of wagering elements awarded. In a given period of time, higher level players, or players who have invested more time playing the game may earn more wagering elements per unit of time than a player assigned to a lower level group.

In some embodiments, a player may be permitted to redeem an access token of no redeemable face value, such as, for example, points associated with a player account (e.g., social media account credits, online points associated with a transacting account, etc.), to compress the period of time and receive more wagering elements. The access tokens may be purchased or may be obtained without directly exchanging money for the access tokens. For example, access tokens may be acquired by participating in member events (e.g., completing surveys, receiving training on how to play the wagering game, sharing information about the wagering game with others), spending time participating in the wagering game or in a player account forum (e.g., logged in to a social media account), or viewing advertising. Thus, an entity administering play-for-free wagering games may not receive money from losing player wagers or may not take a rake on wagers, but may receive compensation through advertising revenue or through the purchase of access tokens redeemable for time compressions to continue play of the wagering game or simply to increase the quantity of wagering elements available to a player.

After a player has stopped participating in a play-for-free wagering game, any remaining quantities of the wagering elements may be relinquished by the player in some embodiments. For example, logging out of a play-for-free wagering game administered over the Internet may cause any remaining wagering elements associated with a respective player to be lost. Thus, when the player rejoins the play-for-free wagering game, the quantity of wagering elements given to the player for an allotment of time may not bear any relationship to the quantity of wagering elements held by the player when he or she quit playing a previous session of the wagering game. In other embodiments, the quantity of wagering elements held by a player when stopping participation may be retained and made available to the player, along with any additional quantities of wagering elements granted for new allotments of time, when rejoining the wagering game.

As a specific, nonlimiting example, a play-for-free wagering game may include providing a quantity of valueless wagering elements usable within a predetermined time period to players. The valueless wagering elements may be provided over a network, such as by sending the valueless wagering elements from a user interaction server. Each player may allocate at least one valueless wagering element to an ante wager, such as by providing authorization to the user interaction server. In some embodiments, at least one player may also allocate at least one valueless wagering element to a bonus wager and/or an insurance wager, as described above.

Each player may be dealt a set of player cards, such as by sending from the user interaction server rank and suit information for the set of player cards allocated to each player. After allowing each player to view his or her set of player cards, an indication from each player may be received, such as at the user interaction server, to fold or to allocate at least one additional valueless wagering element to a play wager.

After each player has been allowed to indicate whether to fold or continue play by allocating a play wager, a set of dealer cards may be dealt and/or revealed. For example, rank and suit information for the set of dealer cards may be sent from the user interaction server. Each set of player cards and the set of dealer cards may be evaluated to determine longest straights thereof, such as at a game server.

The ante wager and any play wager may be resolved, such as by comparing (e.g., at a game server) the longest straight of each player who allocated a play wager with the dealer's longest straight to determine a margin of victory (if any). At least one wagering element may be awarded to a player achieving a longer straight than the dealer's longest straight, or a straight of equal length with a winning tie breaker. A number of wagering elements awarded to the player may correlate to the margin of victory, such as by awarding the number of wagering elements according to the base pay table described and presented above. Thus, a greater number of valueless wagering elements may be awarded to a player having a relatively higher margin of victory.

In some embodiments, a player who has exhausted the quantity of valueless wagering elements initially received may provide authorization to redeem a valueless access token, such as at the user interaction server, to qualify for another quantity of valueless wagering elements. In some embodiments, the player may wait a predetermined time period before receiving the another quantity of valueless wagering elements. In either case, another quantity of valueless wagering elements may be provided (e.g., sent from the user interaction server) to the player to enable to player to continue or restart playing the play-for-free wagering game. The another quantity of valueless wagering elements may be usable by the player within another predetermined time period.

Figure 6:
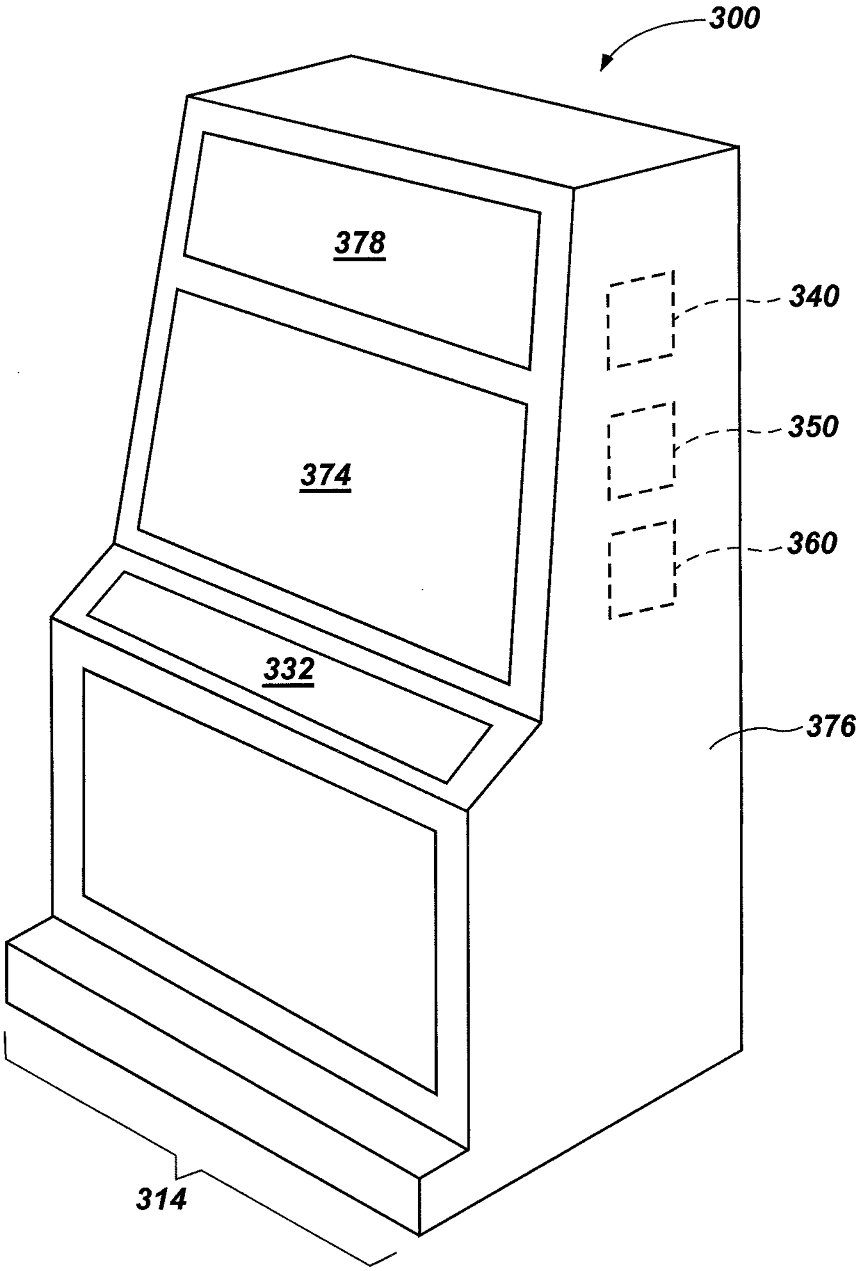
FIG. 6 is a perspective view of an individual electronic gaming device configured for implementation of embodiments of wagering games.

Referring to FIG. 6, an example of an individual electronic gaming device 300 configured for implementation of embodiments of wagering games according to the present disclosure is shown. The individual electronic gaming device 300 may include an individual player position 314 that includes a player input area 332 for a player to interact with the individual electronic gaming device 300 through various input devices (not shown). The electronic gaming device 300 may include a gaming screen 374 configured to display indicia for interacting with the individual electronic gaming device 300, such as through processing one or more programs stored in memory 340 to implement the rules of game play at the individual electronic gaming device 300. Accordingly, game play may be accommodated without involving physical playing cards, poker chips, and/or live personnel. The action may instead be simulated by a control processor 350 operably coupled to the memory 340 and interacting with and controlling the individual electronic gaming device 300. Although the figure has an outline of a traditional gaming cabinet, gaming device 300 may be implemented in any number of ways, including, but not limited to, client software downloaded to a portable device, such as a smartphone, tablet, or laptop personal computer. The gaming device 300 may also be a non-portable personal computer (e.g., a desktop or all-in-one computer) or other computing device. In some embodiments, client software is not downloaded but is native to the device, or otherwise delivered with the device when received by a player.

A communication device 360 may be included and operably coupled to the processor such that information related operation of the gaming device 300, information related to the game play, or combinations thereof may be communicated between the gaming device 300 and other devices through a suitable communication media, such, as, for example, wired networks, wireless (e.g., Wi-Fi) networks, and cellular communication networks.

The gaming screen 374 may be carried by a generally vertically extending cabinet 376 of the individual electronic gaming device 300. The individual electronic gaming device 300 may further include banners configured to communicate rules of game play and/or the like, such as along a top portion 378 of the cabinet 376 of the gaming device 300. The individual electronic gaming device 300 may further include additional decorative lights and speakers for transmitting and/or receiving sounds during game play. Further detail of an example of an individual electronic gaming device (as well as other embodiments of tables and devices) is disclosed in U.S. patent application Ser. No. 13/215,156, filed Aug. 22, 2011, and titled "Methods of Managing Play of Wagering Games and Systems for Managing Play of Wagering Games," the disclosure of which is incorporated herein in its entirety by this reference.

Some embodiments of the present disclosure may be implemented at locations that include a plurality of player stations. Such player stations may include an electronic display screen for display of game information, such as displaying virtual cards, virtual chips, and game instructions, and for accepting wagers and facilitating credit balance adjustments. Such player stations may, optionally, be integrated in a table format, may be distributed throughout a casino or other gaming site, or may include both grouped and distributed player stations. While some features may be automated through electronic interfaces (e.g., virtual cards, virtual chips, etc.), some features may remain in the physical domain. As such, the game play may be administered by a live dealer, a virtual dealer, or a combination of both.

Figure 7:
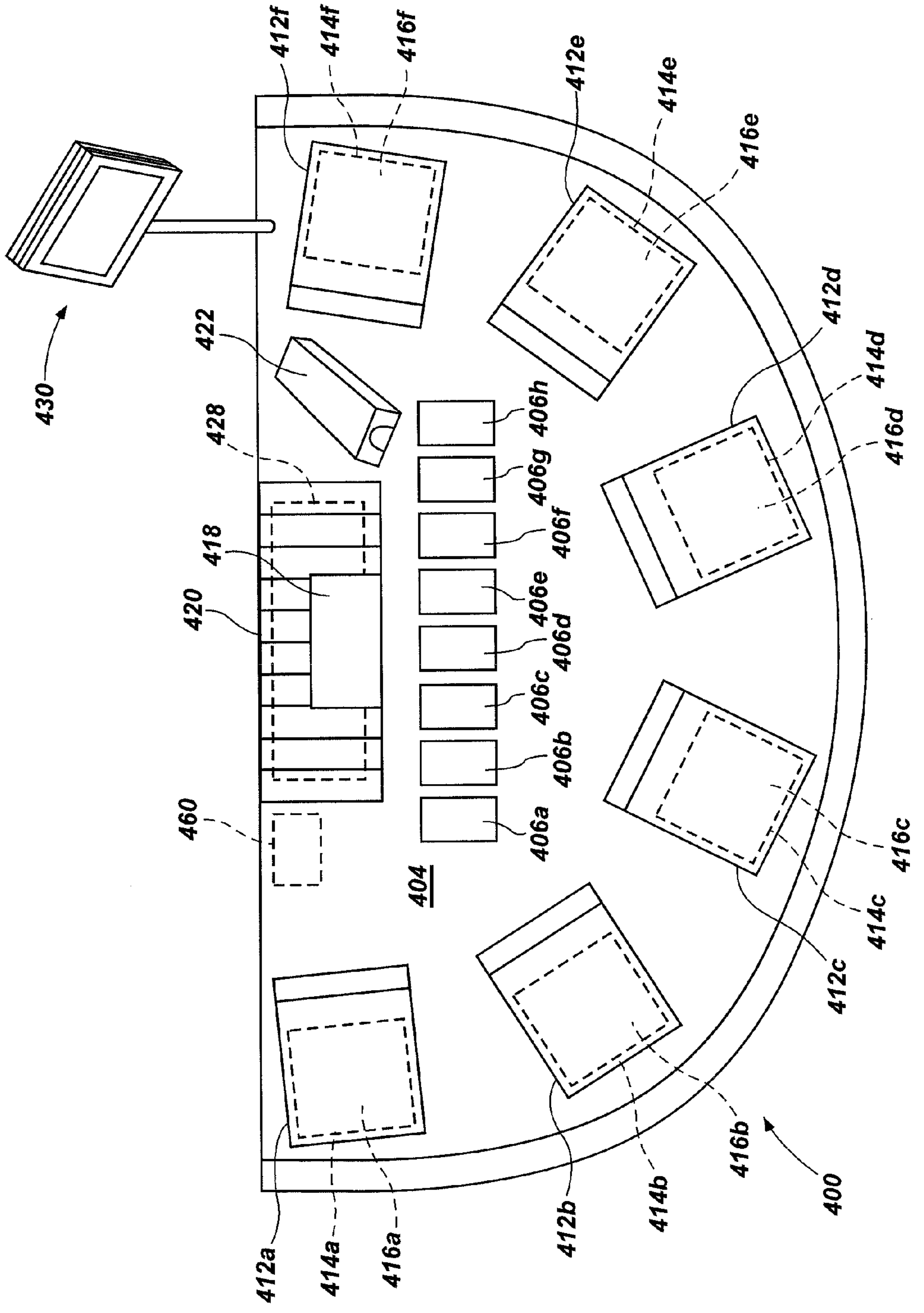
FIG. 7 is a top view of a suitable table configured for implementation of embodiments of wagering games.

Referring to FIG. 7, an example of a suitable table 400 configured for implementation of embodiments of wagering games according to the present disclosure is shown. The table 400 may include a playing surface 404. The table 400 may include a plurality of player stations 412*a* through 412*f*. Each player station 412*a* through 412*f* may include a player interface 416*a* through 416*f*, which may be used for displaying game information (e.g., game instructions, input options, wager information including virtual chips, game outcomes, etc.). The player interface 416*a* through 416*f* may include a display screen in the form of a touch screen, which may be at least substantially flush with the playing surface 404 in some embodiments. Each player interface 416*a* through 416*f* may be coupled respectively with its own local game processor 414*a* through 414*f* (shown in dashed lines), although in some embodiments, a central game processor 428 (shown in dashed lines) may be employed and communicate directly to player interfaces 416*a* through 416*f*. In some embodiments, a combination of individual local game processors 414*a* through 414*f* and a central game processor 428 may be employed.

A communication device 460 (shown in dashed lines) may be included and operably coupled to one or more of the local processors 414, the central game processor 428, or combinations thereof, such that information related to operation of the table 400, information related to the game play, or combinations thereof may be communicated between the table 400 and other devices through a suitable communication media, such, as, for example, wired networks, wireless (e.g., Wi-Fi) networks, and cellular communication networks.

The table 400 may further include additional features, such as a dealer chip tray 420, which may be used by the dealer to cash players in and out of the wagering game, whereas wagers and balance adjustments during game play may be performed using virtual chips. For embodiments using physical cards (e.g., 406*a* through 406*h*), the table 400 may further include a card handling device 422 that may be configured to shuffle, read, and deliver physical cards for the dealer and players to use during game play or, alternatively, a card shoe configured to read and deliver cards that have already been randomized. For embodiments using virtual cards, such virtual cards may be displayed at the individual player interfaces 416*a* through 416*f*. Dealer cards 406*a* through 406*h* may be displayed in a common card area at certain times during game play.

The table 400 may further include a dealer interface 418, which, like the player interfaces 414*a* through 414*f*, may include touch screen controls for assisting the dealer in administering the wagering game. The table 400 may further include an upright display screen 430 configured to display images that depict game information such as pay tables, hand counts, historical win/loss information by player, and a wide variety of other information considered useful to the players. The upright display screen 430 may be double-sided to provide such information to players as well as to the casino pit.

Further detail of an example of a table and player displays is disclosed in U.S. Patent Application Pub. No. 2010/0016050, filed Jul. 15, 2008, now U.S. Pat. No. 8,262,475, issued Sep. 11, 2012, and titled "Chipless Table Split Screen Feature," the disclosure of which is incorporated herein in its entirety by this reference. Although an embodiment is described showing individual discrete player stations, in some embodiments, the entire playing surface 404 may be an electronic display that is logically partitioned to permit game play from a plurality of players for receiving inputs from, and displaying game information to, the players, the dealer, or both.

Figure 8:
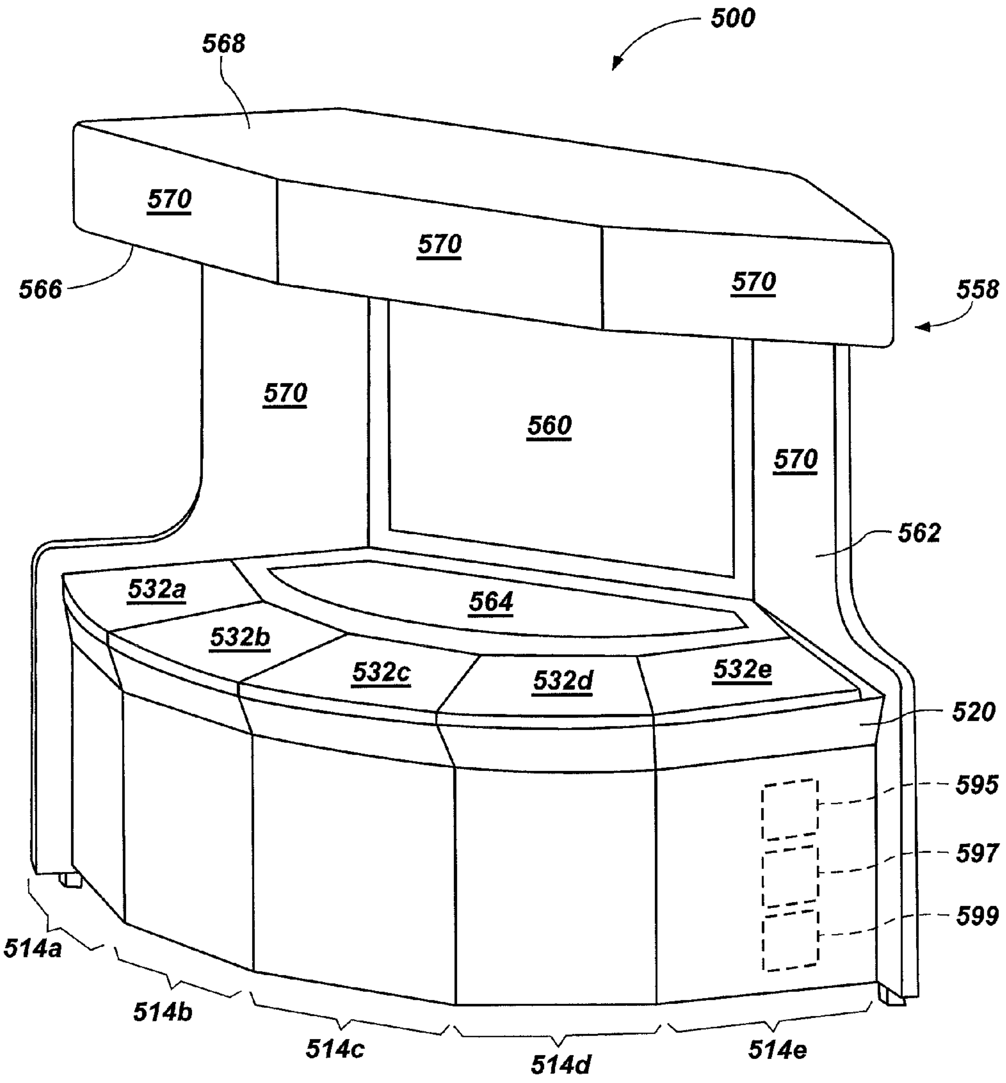
FIG. 8 is a perspective view of another embodiment of a suitable table configured for implementation of embodiments of wagering games having a virtual dealer.

Referring to FIG. 8, another example of a suitable table 500 configured for implementation of embodiments of wagering games having a virtual dealer according to the present disclosure is shown. The table 500 may include player positions 514*a* through 514*e* that are arranged in a bank about an arcuate edge 520 of a video device 558 that may comprise a card screen 564 and a dealer screen 560. The dealer screen 560 may display a video simulation of the dealer (i.e., a virtual dealer) for interacting with the video device 558, such as through processing one or more programs stored in memory 595 to implement the rules of game play at the video device 558. The dealer screen 560 may be carried by a generally vertically extending cabinet 562 of the video device 558. The card screen 564 may be configured to display at least one or more of the dealer's cards, community cards, and/or player's cards by the virtual dealer on the dealer screen 560.

Each of the player positions 514*a* through 514*e* may include a player interface area 532*a* through 532*e*, which is configured for wagering and game play interactions with the video device 558 and/or virtual dealer. Accordingly, game play may be accommodated without involving physical playing cards, poker chips, and/or live personnel. The action may instead be simulated by a control processor 597 interacting with and controlling the video device 558. The control processor 597 may be located internally within, or otherwise proximate to, the video device 558. The control processor 597 may be programmed, by known techniques, to implement the rules of game play at the video device 558. As such, the control processor 597 may interact and communicate with display/input interfaces and data entry inputs for each player interface area 532*a* through 532*e* of the video device 558. Other embodiments of tables and gaming devices may include a control processor that may be similarly adapted to the specific configuration of its associated device.

A communication device 599 may be included and operably coupled to the control processor 597 such that information related to operation of the table 500, information related to the game play, or combinations thereof may be communicated between the table 500 and other devices through a suitable communication media, such, as, for example, wired networks, wireless (e.g., Wi-Fi) networks, and cellular communication networks.

The video device 558 may further include banners configured to communicate rules of play and/or the like, which may be located along one or more walls 570 of the cabinet 562. The video device 558 may further include additional decorative lights and speakers, which may be located on an underside surface 566, for example, of a generally horizontally depending top 568 of the cabinet 562 of the video device 558 generally extending toward the player positions 514*a* through 514*e*.

Further detail of an example of a table and player displays is disclosed in U.S. Patent Application Pub. No. 2005/0164762, filed Jan. 26, 2004, now U.S. Pat. No. 8,272,958, issued Sep. 25, 2012, and titled "Automated Multiplayer Game Table with Unique Image Feed of Dealer," the disclosure of which is incorporated herein in its entirety by this reference. Although an embodiment is described showing individual discrete player stations, in some embodiments, the entire playing surface (e.g., player interface areas 532*a* through 532*e*, card display screen 564, etc.) may be a single electronic display that is logically partitioned to permit game play from a plurality of players for receiving inputs from, and displaying game information to, the players, the dealer, or both.

Figure 9:
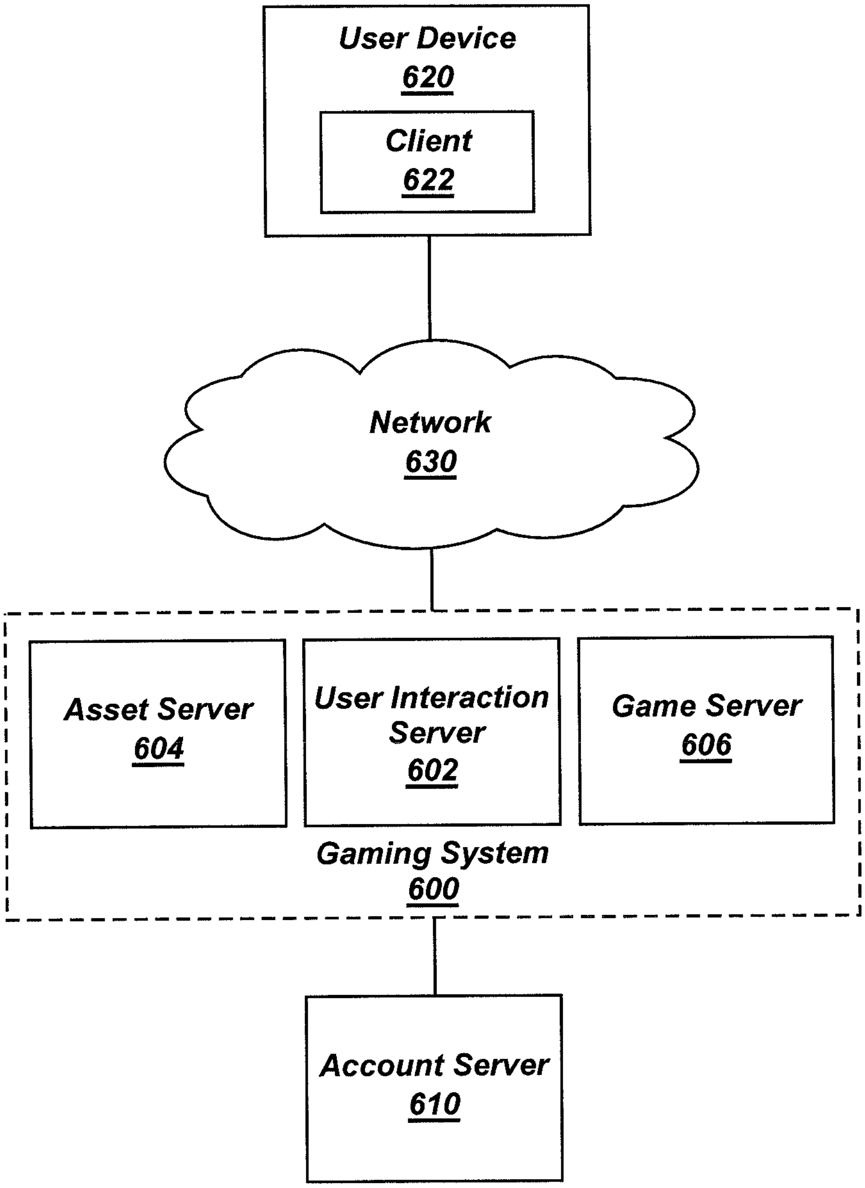
FIG. 9 is a schematic block diagram of a gaming system for implementing embodiments of waging games.

Wagering games in accordance with embodiments of the disclosure may be administered over the Internet, or otherwise online, in one embodiment using a gaming system employing a client server architecture. Referring to FIG. 9, a schematic block diagram of a gaming system 600 for implementing wagering games according to an embodiment is shown. The gaming system 600 enables end users to access proprietary and/or non-proprietary game content. Such game content may include, without limitation, various types of wagering games such as card games, dice games, big wheel games, roulette, scratch off games ("scratchers"), and any other wagering game where the game outcome is determined, in whole or in part, by one or more random events. This includes, but is not be limited to, Class II and Class III games as defined under 25 U.S.C. §2701 et seq. ("Indian Gaming Regulatory Act"). Such games may include banked and/or non-banked games.

The wagering games supported by the gaming system 600 may be operated with real currency or with virtual credits or other virtual (e.g., electronic) value indicia. For example, a real currency option may be used with traditional casino and lottery-type wagering games in which money or other items of value are wagered and may be cashed out at the end of a game session. A virtual credits option may be used with wagering games in which credits (or other symbols) may be issued to a player to be used for the wagers. A player may be credited with credits in any way allowed, including, but not limited to, a player purchasing credits, being awarded credits as part of a contest or a win event in a game according to the present disclosure or another game (including non-wagering games), being awarded credits as a reward for use of a product, casino or other enterprise, time played in one session, games played, or may be as simple as virtual credits awarded upon logging in at a particular time or with a particular frequency, etc. Although credits may be won or lost, the ability of the player to cash out credits may be controlled or prevented. In one example, credits acquired (e.g., purchased or awarded) for use in a play-for-free game may be limited to non-monetary redemption items, awards, or credits usable in the future or for another game or gaming session. The same credit redemption restrictions may be applied to some or all of credits won in a wagering game as well.

An additional variation includes web-based sites having both play-for-free and wagering games, including issuance of free (non-monetary) credits usable to play the play-for-free games. This may attract players to the site and to the games before they engage in wagering. In some embodiments, a limited number of free or promotional credits may be issued to entice players to play the games. Another method of issuing credits includes free credits in exchange for identifying friends who may want to play. In another embodiment, additional credits may be issued after a period of time has elapsed to encourage the player to resume playing the game. The system may enable players to buy additional game credits to allow the player to resume play. Objects of value may be awarded to play-for-free players, which may or may not be in a direct exchange for credits. For example, a prize may be awarded or won for a highest scoring play-for-free player during a defined time interval. All variations of credit redemption are contemplated, as desired by game designers and game hosts (the person or entity controlling the hosting systems).

The gaming system 600 may include a gaming platform that establishes a portal for an end user to access a wagering game hosted by a game server 606 through a user interaction server 602. The user device 620 may communicate with the user interaction server 602 of the gaming system 600 using a network 630 (e.g., the Internet). The user interaction server 602 may communicate with the game server 606 and provide game information to the user. In some embodiments, the game server 606 may also be a game engine. In some embodiments, a single user device communicates with a game provided by the game server 606, while other embodiments may include a plurality of user devices 620 configured to communicate and provide end users with access to the same game provided by the game server 606. In addition, a plurality of end users may access a single user interaction server 602, or a plurality of user interaction servers 602, to access the game server 606.

The user interaction server 602 may communicate with the user device 620 to enable access to the gaming system 600. The user interaction server 602 may enable a user to create and access a user account and interact with game server 606. The user interaction server 602 may enable one or more users to initiate new games, join existing games, and interface with games being played by the user.

The user interaction server 602 may also provide a client 622 for execution on the user device 620 for accessing the gaming system 600. The client 622 provided by the gaming system 600 for execution on the user device 620 can be implemented in a variety of manners according to the user device 620 and method of communication with the gaming system 600. In one embodiment, the user device 620 connects to the gaming system 600 using a web browser and the client 622 executes within a browser window or frame of the web browser. In another embodiment, the client 622 is a stand-alone executable file on the user device 620.

In one embodiment, the client 622 may comprise a relatively small amount of script (e.g., JAVASCRIPT®), also referred to as a "script driver," including scripting language that controls an interface of the client 622. The script driver may include simple function calls requesting information from the gaming system 600. In other words, the script driver stored in the client 622 may merely include calls to functions that are externally defined by, and executed by, the gaming system 600. As a result, the client 622 may be characterized as a "thin client" in which the client 622 may act as little more than a script player. The client 622 may simply send requests to the gaming system 600 rather than performing logic itself. The client 622 receives player inputs and the player inputs are passed to gaming system 600 for processing and executing the wagering game. In one embodiment, this includes providing specific graphical display information to client 622, as well as game outcomes.

In other embodiments, the client 622 comprises an executable file rather than a script. In such a case, the client 622 may do more local processing than does a script driver, such as calculating where to show certain game symbols upon receiving a game outcome from game server 606 through user interaction server 602. In one embodiment, portions of asset server 604 may be loaded onto the client 622 and used by the client 622 in processing and updating graphical displays. Due to security and integrity concerns, most embodiments will have the bulk of the processing of the game play performed in the gaming system 600. However, some embodiments may include significant game processing by client 622 when the client and user device 620 are considered trustworthy or when there is reduced concern for security and integrity in the displayed game outcome. In most embodiments, it is expected that some form of data protection, such as end-to-end encryption, will be used when data is transported over the network 630. The network 630 may be any network, including, but not limited to, the Internet.

In an embodiment where the client 622 implements further logic and game control methodology beyond a thin client, the client 622 may parse and define player interactions prior to passing the player interactions to the gaming system 600. Likewise, when the client 622 receives a gaming interaction from the gaming system 600, the client 622 may be configured to determine how to modify the display as a result of the gaming interaction. The client 622 may also allow the player to change a perspective or otherwise interact with elements of the display which do not change aspects of the game.

The gaming system 600 may include an asset server 604, which may host various media assets (e.g., audio, video, and image files) that may be sent to the client 622 for presenting the various wagering games to the end user. In other words, in this embodiment the assets presented to the end user may be stored separately from the client 622. In one embodiment, the client 622 may request the assets appropriate for the game played by the user; in other embodiments, especially those using thin clients, just those assets that are needed for a particular display event will be sent by game server 600 when the game server 600 determines they are needed, including as few as one asset. In one example, the client 622 may call a function defined at the user interaction server 602 or asset server 604, which may determine which assets are to be delivered to the client 622 as well as how the assets are to be presented by the client 622 to the end user. Different assets may correspond to the various clients that may have access to the game server 606 or to different games to be played.

The game server 606 is configured to perform game play methods and determine game play outcomes that are provided to the user interaction server 602 to be transmitted to user device 620 for display on the end user's computer. For example, the game server 606 may include game rules for one or more wagering games, such that the game server 606 may control some or all of the game flow for a selected wagering game, as well as determining game outcomes. Game server 606 may include pay tables and other game logic. The game server 606 may also perform random number generation for determining random game elements (e.g., player and dealer card rank and suit information) of the wagering game. In one embodiment, the game server 606 is separated from the user interaction server 602 by a firewall or other method of preventing unauthorized access to the game server 606 from the general members of the network 630.

The user device 620 may present a gaming interface to the player and communicate the user interaction to the gaming system 600. The user device 620 may be any electronic system capable of displaying gaming information, receiving user input, and communicating the user input to the gaming system 600. As such, the user device 620 can be a desktop computer, a laptop, a tablet computer, a set-top box, a mobile device (including, but not limited to a smartphone), a kiosk, a terminal, or another computing device. The user device 620 operating the client 622 may comprise an interactive electronic gaming system 300 (see FIG. 6), as described above. The client 622 may be a specialized application or may be executed within a generalized application capable of interpreting instructions from the interactive gaming system 600, such as a web browser.

The client 622 may interface with an end user through a web page, or an application that runs on a device, including, but not limited to, a smartphone, a tablet, or a general computer, or be any other computer program configurable to access the gaming system 600. The client 622 may be illustrated within a casino webpage (or other interface) indicating that the client 622 is embedded into a webpage, which is supported by a web browser executing on the user device 620.

In one embodiment, the gaming system 600 may be operated by different entities. The user device 620 may be operated by a third party, such as a casino or an individual, that links to the gaming system 600, which may be operated, for example, by a wagering game service provider. Therefore, in some embodiments, the user device 620 and client 622 may be operated by a different administrator than the operator of the game server 606. In other words, the user device 620 may be part of a third-party system that does not administer or otherwise control the gaming system 600 or game server 606. In another embodiment, the user interaction server 602 and asset server 604 are provided by a third-party system. For example, a gaming entity (e.g., a casino) may operate the user interaction server 602 and/or user device 620 to provide its customers access to game content managed by a different entity, which may control game server 606, amongst other functionality. In some embodiments, these functions are operated by the same administrator. For example, a gaming entity (e.g., a casino) may elect to perform each of these functions in-house, such as providing both the access to the user device 620 and the actual game content and providing administration of the gaming system 600.

The gaming system 600 may communicate with one or more external account servers 610, optionally through another firewall. For example, the gaming system 600 itself may not directly accept wagers or issue payouts. That is, the gaming system 600 may facilitate online casino gaming, but may not be part of a self-contained online casino itself. Instead, the gaming system 600 may facilitate the play of wagering games owned and controlled by a company offering games and gaming products and services, such as SHFL entertainment, Inc., now owned by Bally Gaming, Inc. Another entity (e.g., a casino or any account holder or financial system of record) may operate and maintain its external account servers 610 to accept bets and make payout distributions. The gaming system 600 may communicate with the account servers 610 to verify the existence of funds for wagering, and instruct the account server 610 to execute debits and credits.

In some embodiments, the gaming system 600 may directly accept bets and make payout distributions, such as in the case where an administrator of the gaming system 600 operates as a casino. As discussed above, the gaming system 600 may be integrated within the operations of a casino rather than separating out functionality (e.g., game content, game play, credits, debits, etc.) among different entities. In addition, in the administration of play-for-free wagering games, the gaming system 600 may issue credits, take bets, and manage the balance of the credits according to the game outcomes, but may not permit payout distributions or be linked to an account server 610 that permits payout distributions of currency. Such credits may be issued for free, through purchase, or for other reasons, without the ability for the player to cash out. Such play-for-free wagering games may be played on platforms that do not permit traditional gambling, such as to comply with jurisdictions that do not permit certain forms of online gambling.

The gaming system 600 may be configured in many ways, from a fully integrated single system to a distributed server architecture. The asset server 604, user interaction server 602, game server 606, and account server 610 may be configured as a single, integrated system of code modules running on a single server or machine, where each of the servers is functionally implemented on a single machine. In such a case, the functionality described herein may not be implemented as separate code modules. The asset server 604, user interaction server 602, game server 606, and account server 610 may also be implemented as a plurality of independent servers, each using its own code modules running on a separate physical machine, and may further include one or more firewalls between selected servers (depending on security needs). Each server could communicate over some kind of networked connection, potentially as varied as that described for network 630. Further, each single server shown in FIG. 9 may be implemented as a plurality of servers with load balancing and scalability factors built into the embodiment. All such embodiments and variations are fully contemplated.

Additional features may be supported by the game server 606, such as hacking and cheating detection, data storage and archival, metrics generation, messages generation, output formatting for different end user devices, as well as other features and operations. For example, the gaming system 600 may include additional features and configurations as described in U.S. patent application Ser. No. 13/353,194, filed Jan. 18, 2012, now U.S. Pat. No. 9,120,007, issued Sep. 1, 2015, and application Ser. No. 13/609,031, filed Sep. 10, 2012, now U.S. Pat. No. 8,974,305, issued Mar. 10, 2015, both titled "Network Gaming Architecture, Gaming Systems, and Related Methods," the disclosures of which are incorporated herein in their entireties by this reference.

The network 630 may enable communications between the user device 620 and the gaming system 600. Another network may also connect the gaming system 600 and account server 610, and, further, one or more additional networks may interconnect one or more of the other servers shown collectively as the game system 600. In one embodiment, the network 630 uses standard communications technologies and/or protocols. Thus, the network 630 can include links using technologies such as Ethernet, 802.11, worldwide interoperability for microwave access (WiMAX), 3 G, digital subscriber line (DSL), asynchronous transfer mode (A™), INFINIBAND®, PCI Express Advanced Switching, etc. Similarly, the networking protocols used on the network 630 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. Data exchanged over the network 630 can be represented using technologies and/or formats including the hypertext markup language (HTML), the extensible markup language (XML), etc. In addition, depending upon the embodiment, the network 630 can include links comprising one or more networks such as the Internet. All or some of the links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 10:
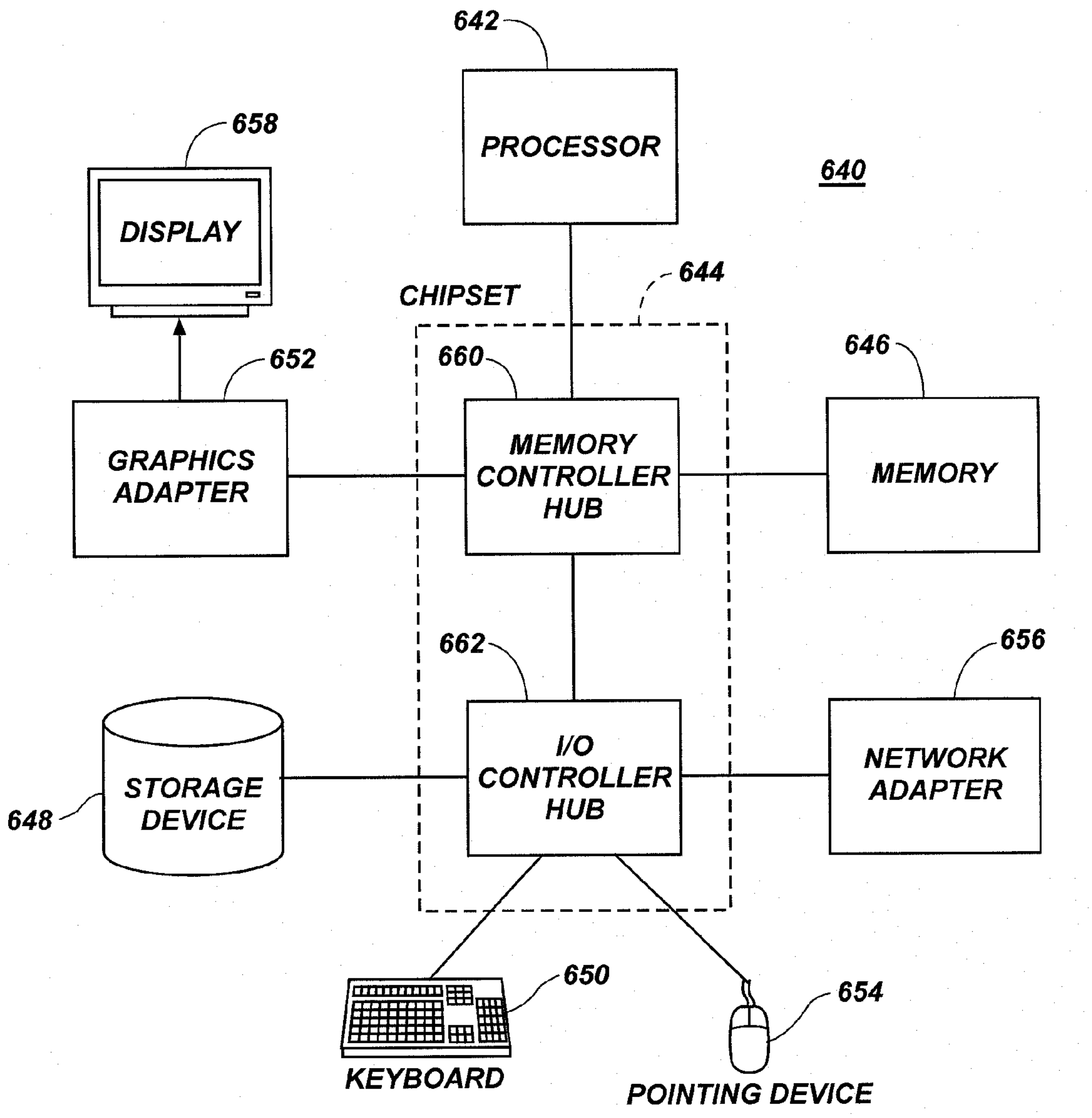
FIG. 10 is a block diagram of a computer for acting as a gaming system according to one embodiment.

Referring to FIG. 10, a high-level block diagram of a computer system 640 for acting as a gaming system 600 (see FIG. 9) according to one embodiment is shown. Illustrated are at least one processor 642 coupled to a chipset 644, as indicated in dashed lines. Also coupled to the chipset 644 are a memory 646, a storage device 648, a keyboard 650, a graphics adapter 652, a pointing device 654, and a network adapter 656. A display screen 658 is coupled to the graphics adapter 652. In one embodiment, the functionality of the chipset 644 is provided by a memory controller hub 660 and an I/O controller hub 662. In another embodiment, the memory 646 is coupled directly to the processor 642 instead of to the chipset 644.

The storage device 648 may be any non-transitory computer-readable storage medium, such as a hard drive, a compact disc read-only memory (CD-ROM), DVD, or a solid-state memory device (e.g., a Flash drive). The memory 646 holds instructions and data used by the processor 642. The pointing device 654 may be a mouse, a track pad, a track ball, a touch screen interface, or other type of pointing device, and may be used in combination with the keyboard 650 to input data into the computer system 640. The graphics adapter 652 displays images and other information on the display screen 658. The network adapter 656 couples the computer system 640 to a local or wide area network.

As is known in the art, a computer system 640 can have different and/or other components than those shown in FIG. 10. In addition, the computer system 640 can lack certain illustrated components. In one embodiment, a computer system 640 acting as a gaming system 600 lacks a keyboard 650, pointing device 654, graphics adapter 652, and/or display 658. Moreover, the storage device 648 can be local and/or remote from the computer system 640 (such as embodied within a storage area network (SAN)). Moreover, other input devices, such as, for example, touch screens may be included.

The network adapter 656 (which may also be referred to herein as a communication device) may include one or more devices for communicating using one or more of the communication media and protocols discussed above with respect to FIG. 9.

In addition, some or all of the components of the general computer system 640 of FIG. 10 may be used as part of the processor and memory discussed above with respect to the systems of FIGS. 6, 7, and 8.

The gaming system 600 may comprise several such computer systems 640. The gaming system 600 may include load balancers, firewalls, and various other components for assisting the gaming system 600 to provide services to a variety of user devices.

As is known in the art, the computer system 640 may be adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on the storage device 648, loaded into the memory 646, and executed by the processor 642.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Some portions of the present disclosure are presented in terms of algorithms (e.g., as represented in flowcharts, prose descriptions, or both) and symbolic representations of operations on data bits within a computer memory. These algorithmic descriptions and representations may be the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments of the present disclosure include process steps and instructions described herein in the form of an algorithm. It should be noted that the process steps and instructions can be embodied in software, firmware, or hardware, and when embodied in software, may be downloaded to reside on and be operated from different platforms used by a variety of operating systems. The embodiments can also be implemented in a computer program product, which can be executed on a computing system.

Some embodiments also relate to an apparatus for performing the operations herein. Such an apparatus may be specially constructed for the purposes, e.g., a specific computer, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be a transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for the purposes of enablement and best mode.

Example

Figure 11:
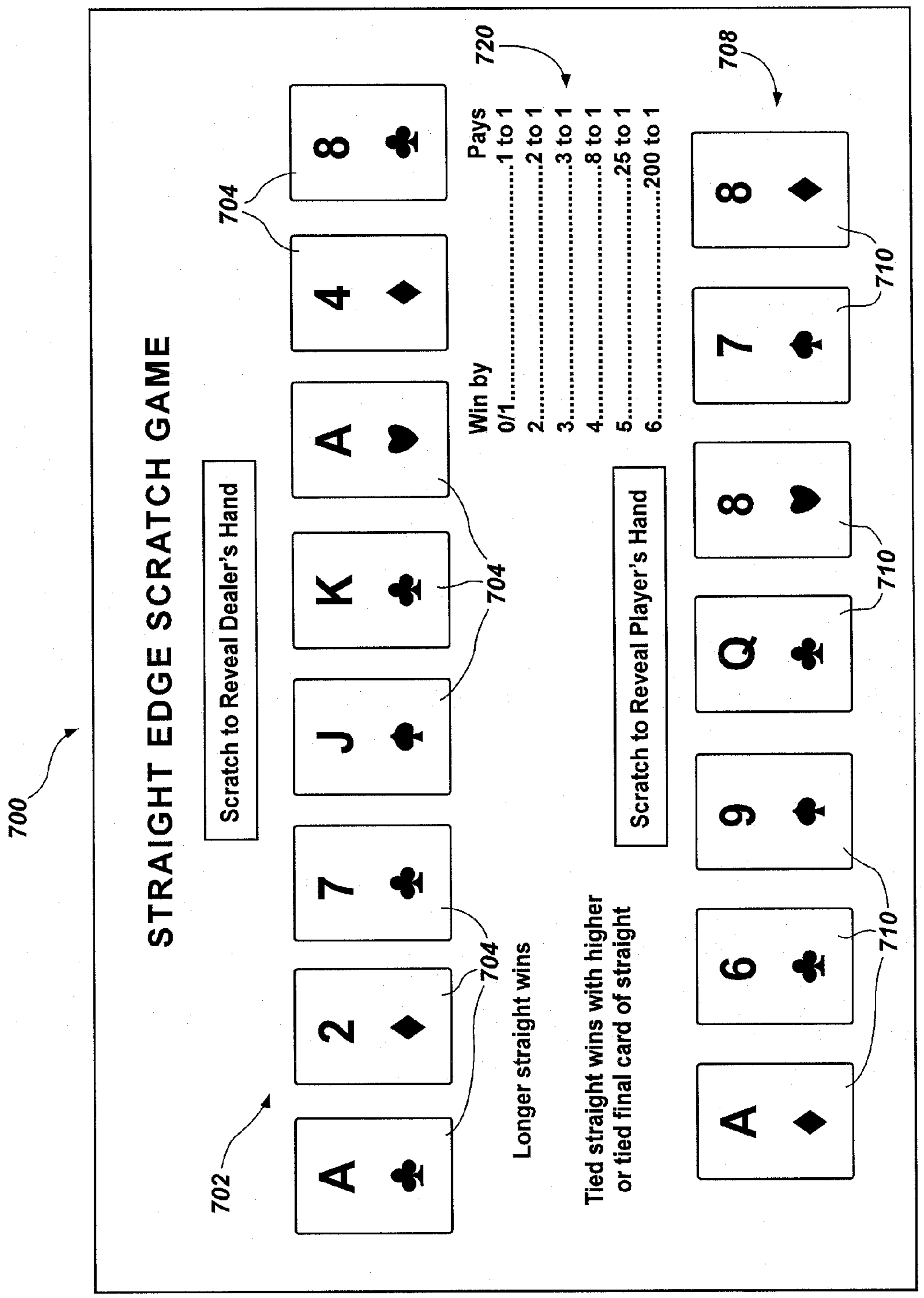
FIG. 11 is a schematic diagram of a scratch card implementation of a wagering game.

With reference to FIG. 11, a schematic diagram of a wagering game implemented as a scratch card 700 is shown, according to an embodiment of the present disclosure. The scratch card 700 may be implemented as a physical scratch card or a digital scratch card, for example. If the scratch card 700 is a physical scratch card, then representations of cards may be initially covered by an opaque scratch-off covering that may be removed by, for example, scratching off the covering with a coin, fingernail, etc., as is known in the art. If the scratch card 700 is a digital scratch card, then representations of cards may be obscured digitally, or may be stored only in memory, and the representations of cards may be revealed or shown by selecting the location of the representation of cards (e.g., by a mouse click, touching a touch screen, toggling through the representations then selecting "enter," etc.) or by effecting a motion that represents scratching (e.g., by holding down a mouse button and passing a digital cursor back and forth across the representation, by back and forth motions with a finger on a touch screen, etc.).

The scratch card 700 may include a dealer card area 702 in which representations of dealer cards 704 are to be positioned and a player card area 708 in which a plurality of representations of player cards 710 are to be positioned. In the embodiment shown in FIG. 11, the dealer card area 702 includes eight representations of cards 704 and the player card area 708 includes seven representations of cards 710. However, in other embodiments, the dealer card area 702 may include any number of representations of dealer cards 704 and the player card area 708 may also include any number of representations of player cards 710. For example, the dealer card area 702 may include fewer representations of dealer cards 704, such as a same number of dealer cards as a number of player cards. In other embodiments, one or both of the dealer card area 702 and the player card area 708 may include additional representations of cards 704, 710 and the player may select the representations of dealer cards and/or player cards to be revealed, while leaving one or more representations of cards obscured. Such embodiments may provide the player with an additional sense of control over an outcome of the game. Although the rank and suit of the representations of cards are shown in FIG. 11 for ease of explanation, when a participating player initially purchases the scratch card 700, the rank and suit of the representations of cards may be obscured and undetectable by the participating player.

If the scratch card 700 is a physical scratch card, the rank and suit of each representation of card may be determined by a random number generator at the time of printing the scratch card 700. If the scratch card 700 is a digital scratch card implemented on a computer system or network, for example, the rank and suit of each representation of card may be determined by a random number generator associated with the digital scratch card and/or the computer system or network that implements the digital scratch card 700.

Referring to FIG. 11, a participating player may purchase the scratch card 700 from an establishment, such as for a fixed price of $1 (or another fixed price), for example. To illustrate how the wagering game is played using the scratch card 700, the participating player may reveal the requisite number (e.g., eight in the embodiment shown in FIG. 11) of representations of dealer cards 704 in the dealer card area 702 and may reveal the requisite number (e.g., seven in the embodiment shown in FIG. 11) of representations of player cards 710 in the player card area 708. For purposes of illustration and by way of non-limiting example, the revealed representations of dealer cards 704 in the dealer card area 702 may be two aces, a 2, a 7, a jack, a king, a 4, and an 8. The revealed representations of player cards 710 in the player card area 708 may be an ace, a 6, a 9, a queen, two 8s, and a 7. With these revealed representations of cards 704, 710, the dealer's longest straight may be formed by a king, an ace, and a 2 (in an embodiment in which wrap-around straights are allowed, as explained above), and the player's longest straight may be formed by a 6, a 7, an 8, and a 9. Accordingly, the player has achieved a four-card longest straight and the dealer has formed a three-card longest straight. Thus, the player has won by a margin of victory of one card, and the establishment from which the scratch card 700 was purchased or another establishment responsible for providing payouts may accept the scratch card 700 and pay an appropriate payout to the participating player according to a pay table 720. In this example, a payout of 1 to 1 may be paid to the player holding the scratch card 700. In some embodiments, the original purchase price of the card may be returned to the player and an additional fixed odds payout (e.g., an amount equal to the purchase price in the example shown in FIG. 11) may be paid according to the base pay table 720.

Although the scratch card 700 has been described as being sold for a fixed price and as providing fixed payouts, the present disclosure is not so limited. For example, the scratch card 700 may be offered for sale at a variable price, and the base pay table 720 may provide odds or multiples of the paid price as potential payouts. A purchase price at which a particular scratch card 700 is bought may be printed on the scratch card 700 at the time of sale. Thus, a participating player may wager more on the scratch card 700 by paying a higher price for the scratch card 700, and may qualify for a higher payout if a winning hand is achieved with the scratch card 700 purchased for a higher price.

Additional nonlimiting example embodiments of the present disclosure include the following.

Embodiment 1

A method of administering a wagering game, comprising: accepting an ante wager from at least one participating player; dealing a set of player cards to the at least one participating player; dealing a set of dealer cards face down to a dealer position, wherein the set of dealer cards is formed of at least one more card than the set of player cards; allowing the at least one player to inspect his or her set of player cards; accepting a play wager from the at least one participating player; and resolving the ante wager and the play wager, comprising: comparing a longest straight of the set of player cards of the at least one player with a longest straight of the set of dealer cards; and paying a base payout to the at least one player solely when the longest straight of the set of player cards is longer than the longest straight of the set of dealer cards or when the longest straight of the set of player cards is of equal length to the longest straight of the set of dealer cards and a predetermined tie breaker is settled in favor of the at least one player.

Embodiment 2

The method of Embodiment 1, further comprising: accepting a bonus wager from the at least one player prior to allowing the at least one player to inspect his or her set of player cards; and paying a bonus payout to the at least one player when the longest player straight is formed by a predetermined minimum number of cards.

Embodiment 3

The method of Embodiment 2, wherein paying a bonus payout to the at least one player when the longest player straight is formed by a predetermined minimum number of cards comprises paying the bonus payout to the at least one player when the longest player straight is formed by at least four cards.

Embodiment 4

The method of Embodiment 2 or Embodiment 3, wherein paying a bonus payout to the at least one player comprises paying a fixed odds payout according to the following bonus pay table:

| Longest Straight | Bonus Payout |
|---|---|
| 7 cards | 40 to 1 |
| 6 cards | 15 to 1 |
| 5 cards | 6 to 1 |
| 4 cards | 3 to 2 |

Embodiment 5

The method of any one of Embodiments 1 through 4, further comprising determining the longest player straight and the longest dealer straight, wherein at least one of the longest player straight and the longest dealer straight is a wrap-around straight including at least a king card, an ace card, and a 2 card.

Embodiment 6

The method of any one of Embodiments 1 through 5, wherein: dealing a set of player cards to the at least one participating player comprises dealing seven player cards to the at least one participating player; and dealing a set of dealer cards to a dealer position comprises dealing eight dealer cards to the dealer position.

Embodiment 7

The method of any one of Embodiments 1 through 6, further comprising determining whether a final card of the longest straight of the set of player cards is higher or equal in rank to a final card of the longest straight of the set of dealer cards to settle the predetermined tie breaker.

Embodiment 8

The method of any one of Embodiments 1 through 7, wherein accepting a play wager comprises accepting a predetermined multiple of the ante wager.

Embodiment 9

The method of any one of Embodiments 1 through 8, further comprising: accepting an insurance wager from the at least one player before allowing the at least one player to inspect his or her set of player cards; and paying an insurance payout to the at least one player when the set of player cards of the at least one player does not include at least a two-card straight.

Embodiment 10

The method of Embodiment 9, wherein paying an insurance payout to the at least one player comprises paying a fixed odds payout of 25 to 1.

Embodiment 11

The method of any one of Embodiments 1 through 10, further comprising retaining the ante wager and the play wager when the longest straight of the set of player cards of the at least one player is shorter than the longest straight of the set of dealer cards or when the longest straight of the set of player cards of the at least one player is of equal length to the longest straight of the set of dealer cards and the final card of the longest straight of the set of player cards of the at least one player is of lower rank than the final card of the longest straight of the set of dealer cards.

Embodiment 12

A method of administering a wagering game, comprising: dealing a first set of cards and a second set of cards face down to respective first and second positions; accepting an ante wager from a player associated with the first set of cards; allowing the player to inspect the first set of cards; allowing the player to fold or place a play wager; accepting a play wager from the player; comparing a longest straight of the first set of cards with a longest straight of the second set of cards; and resolving the ante wager and the play wager, comprising paying a base payout to the player when the longest straight of the first set of cards is longer than the longest straight of the second set of cards or when the longest straight of the first set of cards is of equal length to the second set of cards and the final card of the longest straight of the first set of cards is higher or equal in rank to the final card of the longest straight of the second set of cards, wherein the base payout is a fixed odds payout corresponding to a difference in length between the longest straight of the first set of cards and the longest straight of the second set of cards.

Embodiment 13

The method of Embodiment 12, wherein paying a base payout comprises paying the fixed odds payout according to the following base pay table:

| Margin of Victory | Base Payout |
|---|---|
| 6 | 200 to 1 |
| 5 | 25 to 1 |
| 4 | 8 to 1 |
| 3 | 3 to 1 |
| 2 | 2 to 1 |
| 1 | 1 to 1 |
| 0, with tie breaker | 1 to 1 |

Embodiment 14

The method of Embodiment 12 or Embodiment 13, wherein dealing a second set of cards to a second position comprises dealing the second set of cards to a dealer position.

Embodiment 15

The method of any one of Embodiments 12 through 14, wherein dealing a first set of cards and a second set of cards comprises dealing a first number of cards to form the first set of cards and dealing a second number of cards to form the second set of cards, the second number of cards being greater than the first number of cards.

Embodiment 16

The method of Embodiment 15, wherein dealing a second set of cards comprises dealing one more card to the second position than the first number of cards dealt to the first position to form the first set of cards.

Embodiment 17

The method of any one of Embodiments 12 through 16, further comprising accepting a bonus wager from the player prior to allowing the player to inspect the first set of cards, the bonus wager qualifying the player for a bonus payout when the first set of cards includes a longest straight of a minimum number of cards.

Embodiment 18

The method of any one of Embodiments 12 through 17, further comprising accepting an insurance wager from the player prior to allowing the player to inspect the first set of cards, the insurance wager qualifying the player for an insurance payout when the first set of cards does not include at least a two-card straight.

Embodiment 19

The method of any one of Embodiments 12 through 18, wherein dealing a first set of cards and a second set of cards face down to respective first and second positions comprises dealing a first set of physical playing cards to a first position on a physical gaming table and dealing a second set of physical playing cards to a second position on the physical gaming table.

Embodiment 20

A gaming table for administering a wagering game, comprising: a playing surface including at least one player interface for at least one player position; and at least one processor programmed to: accept an ante wager from each participating player; process rank information of seven player cards dealt to each participating player; receive from each participating player an indication to fold or an indication to place a play wager; accept the play wager from at least one participating player; process rank information of eight dealer cards dealt to a dealer position; identify a longest straight of the seven player cards dealt to each participating player from whom a play wager was accepted; identify a longest straight of the eight dealer cards; compare the longest straight of the seven player cards dealt to each participating player from whom a play wager was accepted with the longest straight of the eight dealer cards; and process payment of a base payout to each participating player with a longest straight that is longer than the longest straight of the eight dealer cards or that is equal in length to the longest straight of the eight dealer cards and includes a final card that is higher or equal in rank to a final card of the longest straight of the eight dealer cards.

Embodiment 21

A method of administering a player-banked wagering game over a network, comprising: receiving at a user interaction server authorization from players to receive a player-banked ante wager in a player-banked pot; sending from the user interaction server rank information for seven cards allocated to each player; receiving at the user interaction server user instructions from each player to fold or to place a play wager in the player-banked pot; sending from the user interaction server rank information for eight dealer cards; evaluating at a game server a longest straight of the allocated seven cards of each player from whom instructions were received to place a play wager in the player-banked pot; evaluating at the game server a longest straight of the eight dealer cards; and resolving the ante and play wagers by comparing at the game server the longest straight of each player's allocated seven cards with the longest straight of the eight dealer cards, wherein an entire remaining amount in the player-banked pot is awarded to the player or players with the longest straight formed of the greatest number of cards.

Embodiment 22

A method of administering a play-for-free wagering game over a network, comprising: sending from a user interaction server a quantity of valueless wagering elements usable within a predetermined time period to players; receiving at the user interaction server authorization from each player to allocate at least one valueless wagering element to an ante wager; sending from the user interaction server rank information for a set of player cards allocated to each player; receiving at the user interaction server an indication from each player to fold or to allocate at least one additional valueless wagering element to a play wager; sending from the user interaction server rank information for a set of dealer cards; evaluating at a game server a longest straight of each player's allocated set of player cards and a longest straight of the set of dealer cards; straight to the dealer's longest straight, wherein at least one valueless wagering element is awarded to a player achieving a longer straight than the dealer's longest straight or a longest straight of equal length with a higher or tied final card in the player's longest straight compared to a final card of the dealer's longest straight, wherein the number of valueless wagering elements awarded to the player correlates to a difference between the number of cards in the player's longest straight and the number of cards in the dealer's longest straight; and receiving authorization to redeem a valueless access token at the user interaction server from a player who has exhausted the quantity of valueless wagering elements or determining that the predetermined time period has lapsed for a player who has exhausted the quantity of valueless wagering elements and sending from the user interaction server another quantity of valueless wagering elements usable within another predetermined time period to the player, wherein the resolving of the ante wager and any play wager is based on the evaluation of at most straights and final cards of straights.

Embodiment 23

A method of administering a player-banked wagering game over a network, comprising: sending from a user interaction server a quantity of valueless wagering elements usable within a predetermined time period to players; receiving at the user interaction server authorization from each player to allocate at least one valueless wagering element to an ante wager; sending from the user interaction server rank information for a set of player cards allocated to each player; receiving at the user interaction server an indication from each player to fold or to allocate at least one additional valueless wagering element to a play wager; sending from the user interaction server rank information for a set of dealer cards; evaluating at a game server a longest straight of each player's allocated set of player cards and a longest straight of the set of dealer cards; resolving the ante wager and any play wager by comparing at the game server each player's longest straight to the dealer's longest straight, wherein at least one valueless wagering element is awarded to a player achieving a longer straight than the dealer's longest straight or a longest straight of equal length with a higher or tied final card in the player's longest straight compared to a final card of the dealer's longest straight, wherein the number of valueless wagering elements awarded to the player correlates to a difference between the number of cards in the player's longest straight and the number of cards in the dealer's longest straight; and receiving authorization to redeem a valueless access token at the user interaction server from a player who has exhausted the quantity of valueless wagering elements or determining that the predetermined time period has lapsed for a player who has exhausted the quantity of valueless wagering elements and sending from the user interaction server another quantity of valueless wagering elements usable within another predetermined time period to the player, wherein the resolving of the ante wager and any play wager is based on the evaluation of at most straights and final cards of straights.

Embodiment 24

The method of Embodiment 21, further comprising: receiving at the user interaction server authorization to receive a progressive bonus wager from at least one player and sending from the user interaction server an indication that the progressive bonus wager has been added to a progressive pot separate from the player-banked pot; transferring a rake from the progressive pot to an account server; evaluating at the game server each player's longest straight to determine whether the longest straight is of a predetermined minimum length; and resolving the progressive bonus wager by awarding at least a portion of the progressive pot, less the rake, to a player when the player's longest straight is of at least the predetermined minimum length.

Embodiment 25

The method of any one of Embodiments 1 through 18, further comprising using physical playing cards.

Embodiment 26

The gaming table of claim 20, wherein the at least one processor is programmed to process ranking information of seven physical player cards and of eight physical dealer cards.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being within the scope of the disclosure, as contemplated by the inventors.

What is claimed is:

1. A gaming table for administering a wagering game, comprising:

a playing surface of the gaming table including at least one player interface for at least one player position at the gaming table; and at least one processor programmed to:

cause an indication of an ante wager on the playing surface of the gaming table from each participating player to be received at a memory controller hub;

cause the indication of the ante wager to be stored in a memory device;

determine rank information of seven player cards dealt to each participating player;

cause the rank information of the seven player cards dealt to each participating player to be stored in the memory device;

cause an indication to fold or an indication to place a play wager from each participating player to be received at the memory controller hub;

cause the indication to fold or indication to place a play wager from each participating player to be stored in the memory device;

cause the play wager from at least one participating player to be accepted by the gaming table;

determine rank information of seven dealer cards dealt to a dealer position;

cause the rank information of the seven dealer cards dealt to the dealer position to be stored in the memory device;

identify a longest straight of the seven player cards dealt to each participating player from whom a play wager was accepted;

cause information related to the longest straight of the seven player cards dealt to each participating player from whom a play wager was accepted to be stored in the memory device;

identify a longest straight of the seven dealer cards;

cause information related to the longest straight of the seven dealer cards in the memory device;

compare the longest straight of the seven player cards dealt to each participating player from whom a play wager was accepted with the longest straight of the seven dealer cards; and resolve payment of a payout to each participating player with a longest straight that is longer than the longest straight of the seven dealer cards or that is equal in length to the longest straight of the seven dealer cards and includes a final card that is higher in rank to a final card of the longest straight of the seven dealer cards.

2. The gaming table for administering a wagering game of claim 1, wherein the at least one processor is further programmed to push the ante wager and play wager of a participating player when a longest straight of the seven player cards dealt to the participating player is of equal length to the longest straight of the seven dealer cards dealt to the dealer position and the final card of the longest straight of the seven player cards dealt to the participating player is equal in to the final card of the longest straight of the seven dealer cards dealt to the dealer position.

3. A computer implemented method of administering a player-banked wagering game over a network, comprising:

receiving at a game server authorization from players to receive a player-banked ante wager in a player-banked pot;

storing the authorization to receive the player-banked ante wager in a memory device;

determining, with a processor, rank information for seven cards to be allocated to each player;

storing the rank information for the seven cards to be allocated to each player in the memory device;

sending from the game server to a user device rank information for the seven cards allocated to each player;

receiving at the game server user instructions from each player to fold or to place a play wager in the player-banked pot;

storing the user instructions from each player to fold or to place a play wager in the player-banked pot in the memory device;

determining, with a processor, rank information for seven dealer cards;

storing the rank information for the seven dealer cards in the memory device;

sending from the game server to a user device rank information for the seven dealer cards;

evaluating at the game server a longest straight of the allocated seven cards of each player from whom instructions were received to place a play wager in the player-banked pot;

storing information related to the longest straight of the allocated seven cards of each player in the memory device;

evaluating at the game server a longest straight of the seven dealer cards;

storing information related to the longest straight of the seven dealer cards; and resolving the ante and play wagers by comparing at the game server the longest straight of each player's allocated seven cards with the longest straight of the seven dealer cards, wherein an entire remaining amount in the player-banked pot is awarded to the player or players with the longest straight formed of the greatest number of cards.

4. A computer implemented method of administering a play-for-free wagering game over a network, comprising:

determining, with a processor, a quantity of valueless wagering elements usable within a predetermined time period;

sending from a game server, with the processor, to a user device the quantity of valueless wagering elements usable within the predetermined time period to players;

receiving at the game server authorization from each player to allocate at least one valueless wagering element to an ante wager;

storing the authorization to allocate at least one valueless wagering element to an ante wager in a memory device;

determining, with a processor, rank information for a set of player cards to be allocated to each player;

storing the rank information for the set of player cards to be allocated to each player in the memory device;

sending from the game server to a user device rank information for the set of player cards allocated to each player;

receiving at the game server an indication from each player to fold or to allocate at least one additional valueless wagering element to a play wager;

storing the indication from each player to fold or to allocate at least one additional valueless wagering element to a play wager in the memory device;

determining, with a processor, rank information for a set of dealer cards;

storing the rank information for the set of dealer cards in the memory device;

sending from the game server to a user device rank information for the set of dealer cards;

evaluating at the game server a longest straight of each player's allocated set of player cards and a longest straight of the set of dealer cards;

storing information related to the longest straight of each player's allocated set of player cards and the longest straight of the set of dealer cards;

resolving the ante wager and any play wager by comparing at the game server each player's longest straight to the dealer's longest straight, wherein at least one valueless wagering element is awarded to a player achieving a longer straight than the dealer's longest straight or a longest straight of equal length with a higher final card in the player's longest straight compared to a final card of the dealer's longest straight, wherein the number of valueless wagering elements awarded to the player correlates to a difference between the number of cards in the player's longest straight and the number of cards in the dealer's longest straight; and receiving authorization to redeem a valueless access token at the game server from a player who has exhausted the quantity of valueless wagering elements or determining that the predetermined time period has lapsed for a player who has exhausted the quantity of valueless wagering elements and sending from the game server to a user device another quantity of valueless wagering elements usable within another predetermined time period to the player, wherein the resolving of the ante wager and any play wager is based on the evaluation of a comparison of straights and final cards of straights between the set of player cards and the set of dealer cards.

5. The method of claim 4, further comprising pushing the ante wager and the play wager of a player when the longest straight of the set of player cards allocated to the player is of equal length to the longest straight of the set of dealer cards and the final card of the longest straight of the set of player cards allocated to the player is equal in rank to the final card of the longest straight of the set of dealer cards.

6. A method of administering a player-banked wagering game over a network, comprising:

receiving at a game server authorization from players to receive a first poker wager from each player, storing the authorization from players to receive the first poker wager from each player in a memory device, and sending from the game server to a user device an indication that the poker wagers have been added to a first pot;

receiving at the game server authorization to receive at least one second wager from each player, storing the authorization to receive at least one second wager from each player in the memory device, and sending from the game server to a user device an indication that the second wagers have been added to a second pot separate from the first pot;

transferring a rake from at least one of the first and second pots to the game server;

determining, with a processor, rank information for a set of player cards to be allocated to each player;

storing the rank information for the set of player cards to be allocated to each player in the memory device;

sending from the game server to a user device rank information for the set of player cards allocated to each player;

receiving at the game server user instructions from each player to fold or to place a play wager;

storing the user instructions from each player to fold or to place the play wager in the memory device;

receiving at the game server authorization from at least one player to receive a play wager, storing the authorization from at least one player to receive the play w and sending from the game server an indication that the play wager has been added to the second pot;

determining, with a processor, rank information for a set of dealer cards;

storing the rank information for the set of dealer cards in the memory device;

sending from the game server to a user device rank information for a set of dealer cards;

evaluating at the game server a longest straight of each set of player cards;

storing information related to the longest straight of the set of player cards in the memory device;

evaluating at the game server a longest straight of the set of dealer cards;

storing information related to the longest straight of the set of dealer cards in the memory device;

resolving the ante and any play wagers by comparing at the game server the longest straight of each player who placed ante and play wagers with the longest straight of the set of dealer cards, wherein an entire remaining amount in the first pot is awarded to the player holding the longest straight;

resolving the at least one second wager by awarding at least a portion of the second pot, less the rake, to a player when the player's longest straight is of a predetermined minimum length; and distributing at least a portion of the second pot among the players when a predetermined event unrelated to composition of each set of player cards and the set of dealer cards has occurred.

* * * * *

UNITED STATES PATENT AND TRADEMARK OFFICE

CERTIFICATE OF CORRECTION

PATENT NO. : 9,286,763 B2
APPLICATION NO. : 13/920028
DATED : March 15, 2016
INVENTOR(S) : Roger M. Snow and Elliot Frome It is certified that error appears in the above-identified patent and that said Letters Patent is hereby corrected as shown below:

In the specification:

| | | | |
|---|---|---|---|
| | COLUMN 3, | LINE 31, | change "the online gaming" to --the on-line gaming-- |
| | COLUMN 32, | LINE 47, | change "(WiMAX), 3 G, digital" to --(WiMAX), 3G, digital-- |
| | COLUMN 34, | LINE 49, | change "(RAMS)," to --(RAMs),-- |

In the claims:

| | | | |
|---|---|---|---|
| CLAIM 6, | COLUMN 45, | LINE 11, | change "the play w and" to --the play wager, and-- |

Signed and Sealed this
Fourteenth Day of June, 2016

Michelle K. Lee
*Director of the United States Patent and Trademark Office*